(12) United States Patent
Kowald

(10) Patent No.: US 12,168,510 B2
(45) Date of Patent: Dec. 17, 2024

(54) COMPACT PERSONAL FLIGHT VEHICLE

(71) Applicant: SkySurfer Aircraft LLC, Bluffton, SC (US)

(72) Inventor: Hunter William Kowald, Bluffton, SC (US)

(73) Assignee: Hunter William Kowald

( * ) Notice: Subject to any disclaimer, the term of this patent is extended or adjusted under 35 U.S.C. 154(b) by 0 days.

(21) Appl. No.: 18/494,650

(22) Filed: Oct. 25, 2023

(65) Prior Publication Data

US 2024/0262499 A1    Aug. 8, 2024

Related U.S. Application Data

(60) Provisional application No. 63/443,815, filed on Feb. 7, 2023.

(51) Int. Cl.
| | |
|---|---|
| *B64C 39/02* | (2023.01) |
| *B64C 1/06* | (2006.01) |
| *B64C 27/08* | (2023.01) |
| *B64C 27/50* | (2006.01) |
| *B64U 10/16* | (2023.01) |
| *B64U 30/293* | (2023.01) |

(52) U.S. Cl.
CPC ............ *B64C 39/026* (2013.01); *B64C 1/063* (2013.01); *B64U 10/16* (2023.01); *B64U 30/293* (2023.01); *B64C 27/08* (2013.01); *B64C 27/50* (2013.01)

(58) Field of Classification Search
CPC .......... B64U 1/13; B64U 10/14; B64U 10/16; B64U 30/293; B64U 10/13; B64C 39/026
See application file for complete search history.

(56) References Cited

U.S. PATENT DOCUMENTS

| | | | | |
|---|---|---|---|---|
| 2,953,321 | A * | 9/1960 | Robertson | B64C 39/026 |
| | | | | 180/117 |
| 3,506,221 | A * | 4/1970 | Vidal | B64C 39/026 |
| | | | | 244/23 R |
| 7,484,687 | B2 | 2/2009 | Martin | |
| 7,581,608 | B2 | 9/2009 | St. Louis | |
| 8,448,892 | B2 * | 5/2013 | Zhu | B64C 39/001 |
| | | | | 244/23 C |
| 8,608,104 | B2 | 12/2013 | Zapata | |
| 8,651,432 | B2 | 2/2014 | De Roche | |
| 9,145,206 | B1 * | 9/2015 | Robinson | B63H 21/22 |
| 9,957,045 | B1 * | 5/2018 | Daly | G05D 1/0027 |
| 9,981,743 | B2 * | 5/2018 | Thelen | B64D 31/06 |
| 10,075,107 | B2 * | 9/2018 | Lepka | H02P 6/18 |
| 10,239,615 | B2 | 3/2019 | Duru | |
| 10,245,500 | B2 * | 4/2019 | Chen | A63C 17/013 |

(Continued)

FOREIGN PATENT DOCUMENTS

| | | |
|---|---|---|
| CN | 204623828 U | 9/2015 |
| CN | 105059072 A | 11/2015 |

(Continued)

*Primary Examiner* — Joshua J Michener
*Assistant Examiner* — Michael B. Kreiner

(57) ABSTRACT

An apparatus includes a frame and a plurality of propellers coupled to the frame and configured to produce sufficient thrust to allow the apparatus to hover. Each propeller from the plurality of propellers having a horizontally oriented blade and a first propellor from the plurality of propellors overlapping a second propellor from the plurality of propellers in a vertical plane.

30 Claims, 17 Drawing Sheets

(56) References Cited

U.S. PATENT DOCUMENTS

| | | | |
|---|---|---|---|
| 10,343,770 B2 * | 7/2019 | Mullins | B64C 27/14 |
| 10,464,671 B2 | 11/2019 | Duru | |
| 10,526,066 B2 * | 1/2020 | Suzuki | B64C 9/06 |
| 10,543,915 B2 * | 1/2020 | Goldstein | B64U 30/293 |
| 10,589,867 B2 * | 3/2020 | Lukaczyk | B64C 11/00 |
| 10,625,855 B2 * | 4/2020 | Deng | B64U 10/14 |
| 10,696,383 B2 * | 6/2020 | Hsieh | B64C 27/08 |
| 10,703,459 B2 * | 7/2020 | Yang | B64C 29/0033 |
| 10,710,718 B2 | 7/2020 | Duru | |
| 10,718,344 B2 * | 7/2020 | Colley | B60K 8/00 |
| 10,745,129 B2 * | 8/2020 | Near | B64C 39/026 |
| 10,988,255 B1 * | 4/2021 | Tian | B64C 27/008 |
| 11,008,095 B2 * | 5/2021 | Wang | B64U 30/293 |
| 11,117,661 B2 * | 9/2021 | Caubel | B64C 1/063 |
| 11,453,479 B2 * | 9/2022 | Zapata | B64C 39/026 |
| 2016/0340035 A1 * | 11/2016 | Duru | B64D 31/04 |
| 2017/0174335 A1 * | 6/2017 | Malloy | B64C 29/0025 |
| 2017/0247107 A1 * | 8/2017 | Hauer | B64D 35/06 |
| 2018/0127094 A1 * | 5/2018 | Zapata | G05D 1/0858 |
| 2019/0256201 A1 * | 8/2019 | Plekhanov | B64U 20/75 |
| 2020/0047858 A1 * | 2/2020 | Borin | B63B 32/70 |
| 2020/0346784 A1 * | 11/2020 | Guo | B64D 47/06 |
| 2021/0009279 A1 * | 1/2021 | Hauer | B64C 39/024 |
| 2021/0039764 A1 * | 2/2021 | Wu | B64C 1/063 |
| 2021/0039784 A1 * | 2/2021 | Wu | B64U 30/293 |
| 2021/0253246 A1 * | 8/2021 | Tibbitts | B64C 39/026 |
| 2021/0253261 A1 * | 8/2021 | Furukawa | G05G 5/05 |
| 2021/0387721 A1 * | 12/2021 | Tian | B64C 1/30 |
| 2022/0363381 A1 * | 11/2022 | Chan | B64C 39/024 |
| 2023/0011791 A1 * | 1/2023 | Grubisic | B64C 29/0083 |
| 2023/0094788 A1 * | 3/2023 | Zapata | B64C 29/0041 |
| | | | 244/17.23 |
| 2023/0111162 A1 * | 4/2023 | Zapata | B64C 39/026 |
| | | | 60/230 |

FOREIGN PATENT DOCUMENTS

| | | | | |
|---|---|---|---|---|
| CN | 109625258 A | | 4/2019 | |
| DE | 202019003781 U1 * | | 11/2019 | ........ B64C 39/024 |
| EP | 3889044 A1 * | | 10/2021 | ............ B64C 1/06 |
| FR | 3109570 A1 | | 4/2020 | |
| GB | 2529896 A * | | 3/2016 | ........... A63H 27/12 |
| GB | 2578083 A * | | 4/2020 | ........... B64C 15/00 |
| WO | 2017112983 A1 | | 7/2017 | |
| WO | 2017174942 A1 | | 10/2017 | |
| WO | 2021176172 A1 | | 9/2021 | |

\* cited by examiner

COMPACT PERSONAL FLIGHT VEHICLE

CROSS-REFERENCE TO RELATED APPLICATIONS

This application claims priority to provisional U.S. Patent Application No. 63/443,815, filed Feb. 7, 2023, the entire contents of which are hereby incorporated by reference.

TECHNICAL FIELD

The present application relates generally to a compact personal flight vehicle.

BACKGROUND

During the late 1970s and early 1980s many people sought affordable powered flight. As a result, many aviation authorities set up definitions of lightweight, slow-flying airplanes that could be subject to minimum regulations. The resulting airplanes are commonly called ultralight aircraft or microlights, although the terminology differs from country to country.

Recent advancements in battery chemistries, material science, motors, and motor speed controllers has led to some practical production of electric propulsion systems for vertical takeoff and landing applications. Sustaining flight for long periods within a compact all-electric form factor was previously deemed unfeasible since technology has not been able deliver the high performance and continuous output to support this operation. Additionally, the heavy weight of battery chemistries was another significant obstacle to the adoption of electric propulsion within aerial vehicles. Advancements in battery chemistries are leading to solutions which are lighter and more powerful. This combined with a wide range of other design and engineering improvements is leading to airlift now becoming sustainable in compact forms.

SUMMARY

Some embodiments described herein relate to an apparatus that includes a frame and a plurality of propellers coupled to the frame and configured to produce sufficient thrust to allow the apparatus to hover. Each propeller form the plurality of propellers having a horizontally oriented blade, and a first propellor from the plurality of propellors overlapping a second propellor from the plurality of propellers in a vertical plane.

Some embodiments described herein relate to a method of piloting a flying vehicle that includes standing on a frame of the flying vehicle. Actuating a throttle can command a plurality of propellers to rotate to cause the vehicle to perform a vertical take-off maneuver, while the pilot is standing on the frame. The pilot modulating a body position to reduce and/or airflow to at least a first propeller from the plurality of propellers can cause the frame to tilt and translate towards the first propeller.

Some embodiments described herein relate to an apparatus that includes a frame. An even number of propellers can be coupled to the frame and configured to produce thrust in a vertical direction to enable the apparatus to hover. The apparatus includes an even number of motors, each motor coupled to one or more propellers form the event number of propellers. A power bus, from a plurality of power buses, can couple a battery, of a plurality of batteries, to two motors from the even number of motors, such that a failure of the batter causes the remaining batteries to power the two motors.

Some embodiments described herein relate to an apparatus that includes a frame having a central member with a first end portion and a second end portion. The frame is configured to support a human pilot in a standing configuration on a first side of the frame. Arms can be coupled to the central member. For example, first portion of a first arm can be coupled to a first end portion of the central member, a first portion of a second arm can be coupled to the first end portion of the central member, and a first end portion of a third arm can be coupled to a second end portion of the central member. Second end portions of each arm can be coupled to a different propeller. The propellers can be collectively configured to produce at least 200 pounds of thrust, to allow the frame and the human pilot to hover. Each arm can be removably or hingedly connected to the central member such that the arms be moved from an extended configuration to a folded configuration.

BRIEF DESCRIPTION OF THE DRAWINGS

Reference should be made to the following detailed description which should be read in conjunction with the following figures, wherein like numerals represent like parts.

DETAILED DESCRIPTION

Figure 1A:
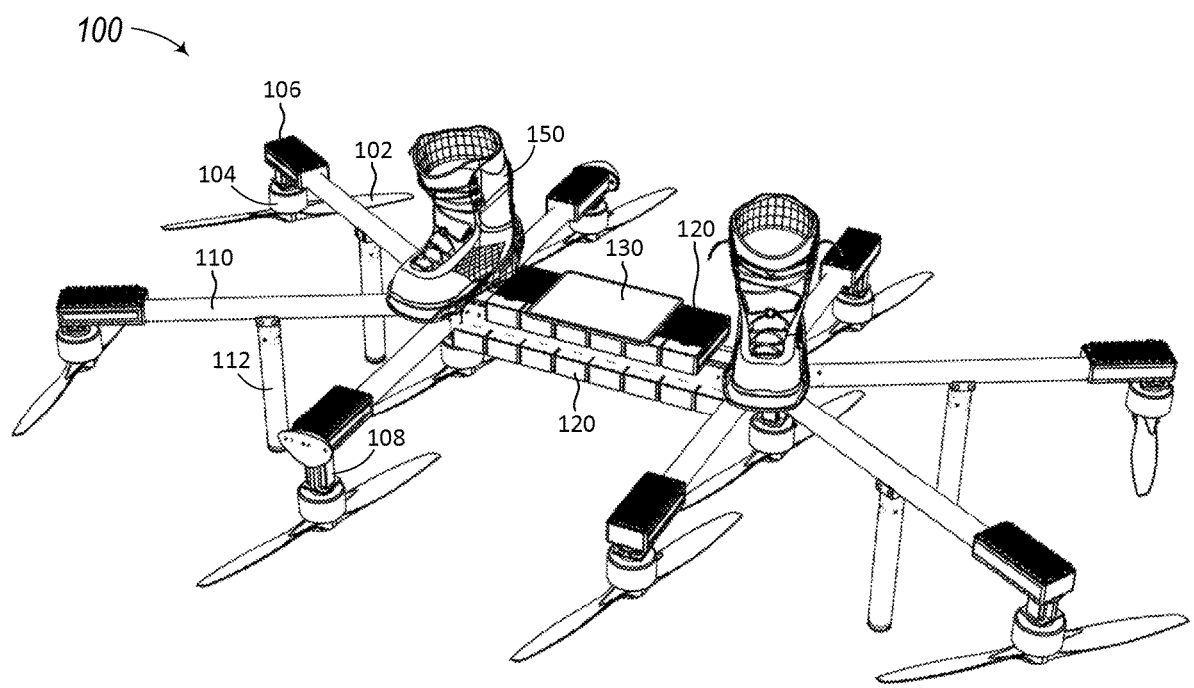
FIG. 1A is an illustrative example of a compact personal flight vehicle, according to an embodiment.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Disclosed herein is a compact personal flight vehicle capable of vertical takeoff and landing which incorporates a propulsion system mounted on a lightweight frame that supports a pilot positioned above the frame. The pilot may steer the vehicle through upper body movements that interfere with the airflow into the propulsion system. The pilot may control the vehicle through a handheld controller, which allows for variable speed control of the propulsion system, and feedback from the vehicle via a screen on the controller. In some embodiments, the pilot stands on a top surface of the vehicle. In some other embodiments, one or more attachments support a majority of the pilot's weight. For example, the one more attachments can include a seat, which can still allow the pilot to steer the vehicle through upper body movements.

The propulsion system may incorporate a plurality of motors, each driving a propeller. Adjacent propellers may overlap each other in order to increase performance specifications, increase efficiency, and make the vehicle more compact than if propellers were not overlapping. To reduce interference between the overlapping propellers, the propellers may be mounted on different levels, where each level has a vertical offset from one or more other levels. Each propeller may therefore be mounted at an offset in height from each adjacent propeller. This allows for a more compact design of the vehicle then would be possible with propellers mounted at the same height. Additionally, this overlap provides increased thrust and operating efficiency which leads to longer flight times and reduced heat generation.

In some embodiments, additional features may be incorporated to make the vehicle compact and easy to transport. For example, the vehicle itself may be foldable for storage and transport. The propellers may be removable for more compact storage, as well as for ease of replacement of a damaged propeller. In some embodiments, the propellers may fold for storage and transport. The battery units may be removable for storage and transport. This can also allow a pilot to quickly change battery units and resume flight operations without having to wait for batteries to charge.

The vehicle may be designed to provide a high level of safety through redundant and isolated systems. In some embodiments, multiple onboard power solutions run together with current sharing, therefore reducing single failure points. In some embodiments, redundant propellers may be incorporated to allow operation to continue if a propeller were to fail while the vehicle is in flight. Since the compact size of the vehicle requires high power components, heat generation must be kept under control (e.g., via active and/or passive cooling methods) and materials which are fireproof, or fire resistant are used in order to sustain safe operation. The vehicle is designed with safety margins on performance specifications. For example, the maximum lifting load of the vehicle may be desired to be at 500 pounds, but the frame may be configured with a 1.5× safety factor margin at 750 pounds.

FIG. 1A is an illustrative example of a compact personal flight vehicle 100, according to an embodiment. The illustrated example embodiment of FIG. 1A includes a frame 300, a plurality of arms 110 extending outwardly from the frame (further described in reference to FIGS. 3A and 3B), a drive assembly coupled to each of the plurality of arms 110 and to opposite ends of the frame, and one or more battery units 120. The illustrated frame is generally rectangular, but a frame may be provided in any shape (e.g., ovular, circular, triangular, etc.). In some embodiments, the frame may have a top surface, which during operation is used as a platform for supporting the feet of a user whereby the user may stand in an upright position on the frame. A proximal end of each of a first group of the plurality of arms 110 extends outwardly from the first end of the frame, and a proximal end of each of a second group of the plurality of arms 110 extends outwardly from a second end of the frame. Each drive assembly may be coupled to a distal end of each of the arms 110 and may include at least one motor 104 for driving at least one propeller 102. In general, power from the battery units 102 energizes the motors 104 and causes rotation of the propellers 102, thus generating lift.

The example of FIG. 1A also includes one or more speed controllers 106 communicatively coupled to the motors 104 to control the speed of the motors. In some embodiments, speed controller 106 is mounted at or near the distal end of arm 110 that motor mount 108 is coupled to. In some embodiments, there is one speed controller 106 for each motor 104. In some other embodiments, multiple motors 104 may be controlled by a single speed controller 106. For example, the speed controller 106 may be mounted in a position on the compact personal flight vehicle 100 that allows for the speed controller 106 to be communicatively coupled to all the motors 104 that are controlled by that speed controller 106. For example, the speed controller 106 can be centrally located on the frame.

The compact personal flight vehicle 100 may also include a plurality of legs 112, which are coupled to a bottom surface of arm 110. The legs 112 act as a landing gear for the compact personal flight vehicle 100. The illustrative example of FIG. 1A shows four legs 112, but any number of legs 112 may be used. In some embodiments, the legs 112 may be coupled to only a subset of the arms 110. For example, the legs 112 may be coupled to every other arm 110. In some embodiments the frame could be designed so that legs 112 are not necessary. For example, the frame may include protrusions, curved portions, supports, and/or the like that can allow for the compact personal flight vehicle to land safely. In some embodiments, the legs 112 are removable. In some embodiments, the legs 112 are permanently formed with the frame. In some embodiments, the legs 112 are cylindrical. In some embodiments, each leg 112 is mounted at the same position along the corresponding arm 110. In some embodiments, the legs 112 are mounted in different positions along the corresponding arm 110. In some embodiments, the legs 112 are mounted along a midpoint of the corresponding arm 110 or are mounted at a different distance along the length of the arm 110. In some implementations, the end of the leg 112 opposite the arm 110 may include a force distributor (e.g., a foot) configured to distribute the weight of the compact personal flight vehicle 100 and/or the pilot on the ground. The legs 112 may be coupled to the arms 110 via a fastener (e.g., screw, nut and bolt, clip, etc.), adhesive, weld, and/or the like.

The compact personal flight vehicle 100 includes one or more battery units 120. In the illustrative example of FIG. 1A, two battery units 120 are shown. One battery unit 120 is coupled with the top surface of the frame (see FIG. 3A), and a second battery unit 120 is coupled with the bottom surface of the frame. In some embodiments, each battery units 120 includes a plurality of batteries and/or battery cells. In some embodiments, each battery unit 120 is configured to provide the compact personal flight vehicle 100 with enough power for flight independently of the other battery unit 120.

The battery units 120 are electrically coupled to the motors 104. In some embodiments, the battery units 120 are coupled to subsets of the motors 104. For example, a first power bus associated with a first battery unit 120 may be coupled for a first motor 104 and a second motor 104 and a second power bus associated with a second battery unit 120 may be coupled to a third motor 104 and a fourth motor 104, the fourth motor 104 disposed between the second motor 104 and the first motor 104 and opposite the third motor 104. The battery units 120 can be configured to share power across the various busses, such that a failure of one battery can cause power to automatically be rerouted from the remaining batteries to all motors. In addition or alternatively, a failure of either a battery units 120 and/or bus could cause failure of only the motors 104 connected to the failed battery by an associated bus, while other motors coupled to other batter(ies) via other bus(ses) would remain in operation and the personal flight vehicle 100 could maintain stability due to the symmetric nature of limited motor failure.

In some embodiments, compact personal flight vehicle 100 includes a tablet computer 130 to display information to the pilot. The tablet computer 130 can display information such as altitude, speed, battery output, remaining battery power, emergency notification, and/or the like.

Figure 3A:
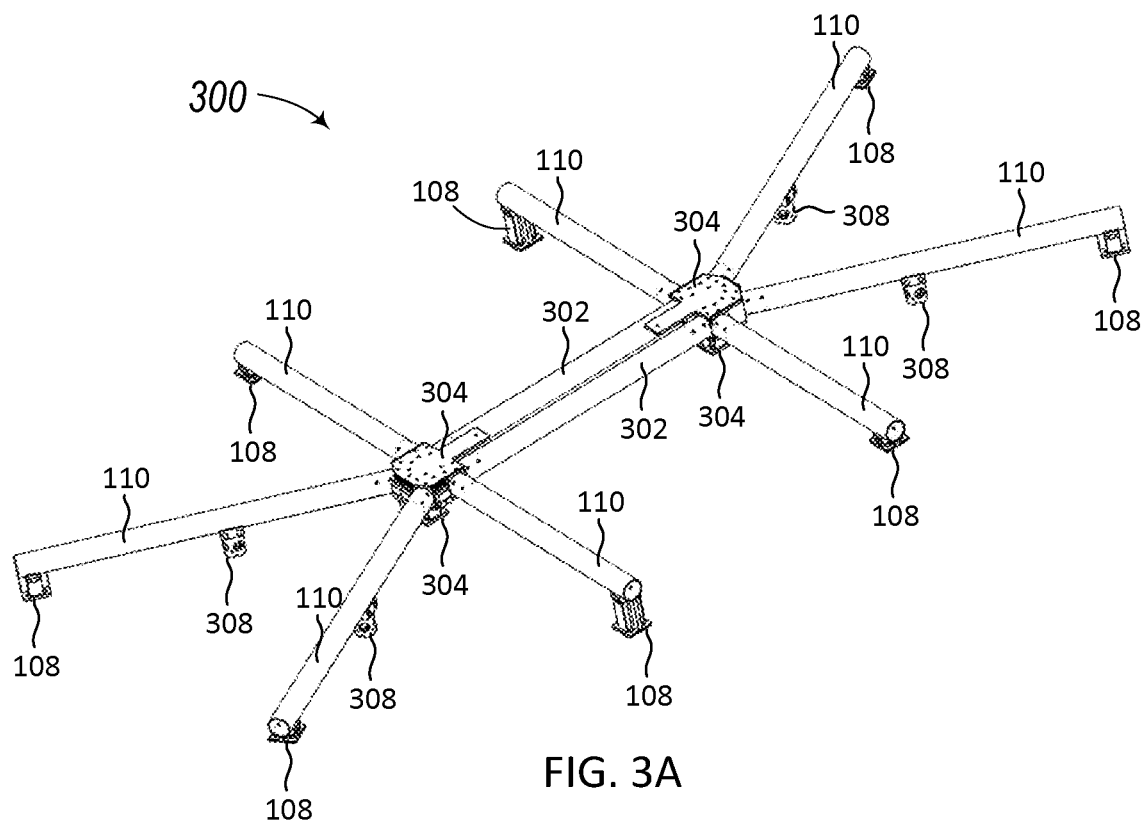
FIG. 3A is a frame for a compact personal flight vehicle, according to an embodiment.
Figure 3B:
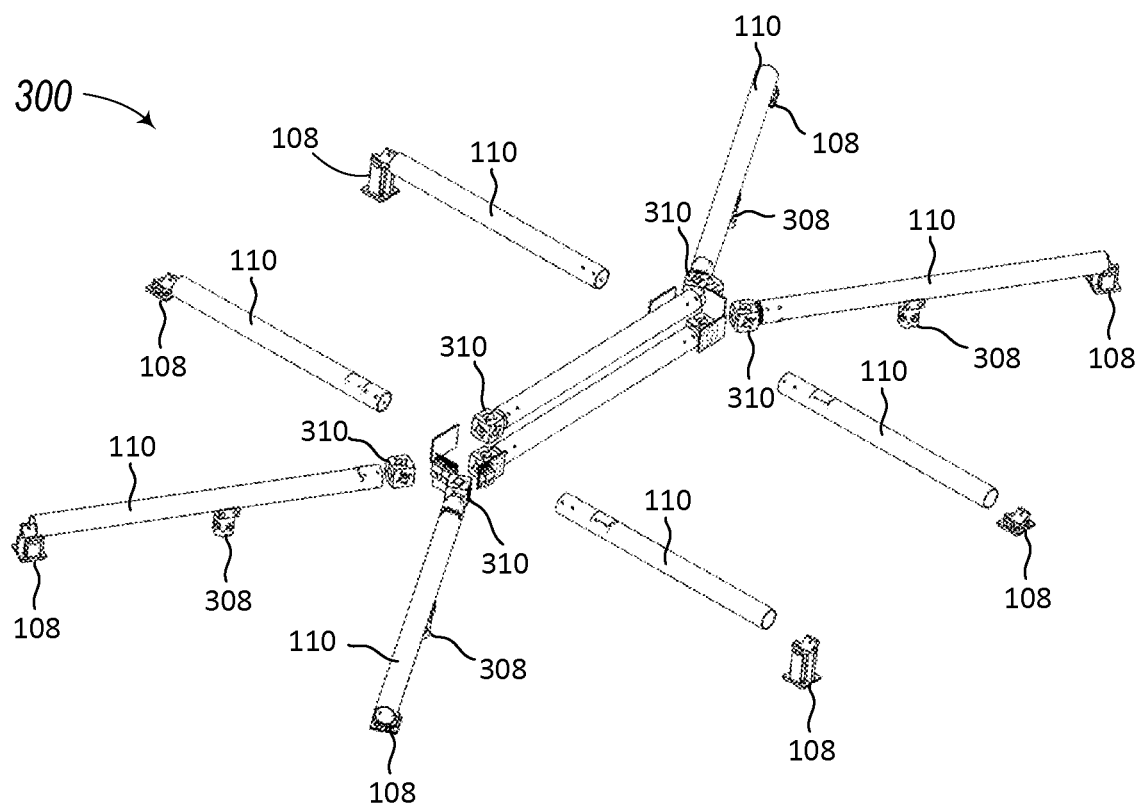
FIG. 3B is an exploded view of a frame for a compact personal flight vehicle, according to an embodiment.

In the illustrative example of FIG. 1A, boots 150 represent the position of the pilot on the compact personal flight vehicle 100. In this example, the boots 150 are positioned on a top surface of endplates 304 (as seen in FIG. 3A). In some embodiments, the boots 150 may be secured to the vehicle using, for example, ratcheting straps with quick release function for immediate removal. In some embodiments, a plurality of straps may be used with each boot to secure the pilot to the vehicle. For example, boots 150 can be coupled to the frame via ski-style, bicycle clip-in style, or any other suitable bindings. In some embodiments, the boots 150 may be positioned in a different position based on the configuration of the frame and/or the endplates 304.

In some other embodiments, the boots 150 may be placed into a slot. In some embodiments, the slot is defined as a space in the frame. In some embodiments, the slot is a space within a foothold coupled to the frame. The slot designates the area for the boots 150 to be placed. In some embodiments, the boots 150 are not secured in the slot and may be freely removed at any time. In some embodiments, the boots 150 may include a fastening mechanism to couple to the endplates 304.

Figure 1B:
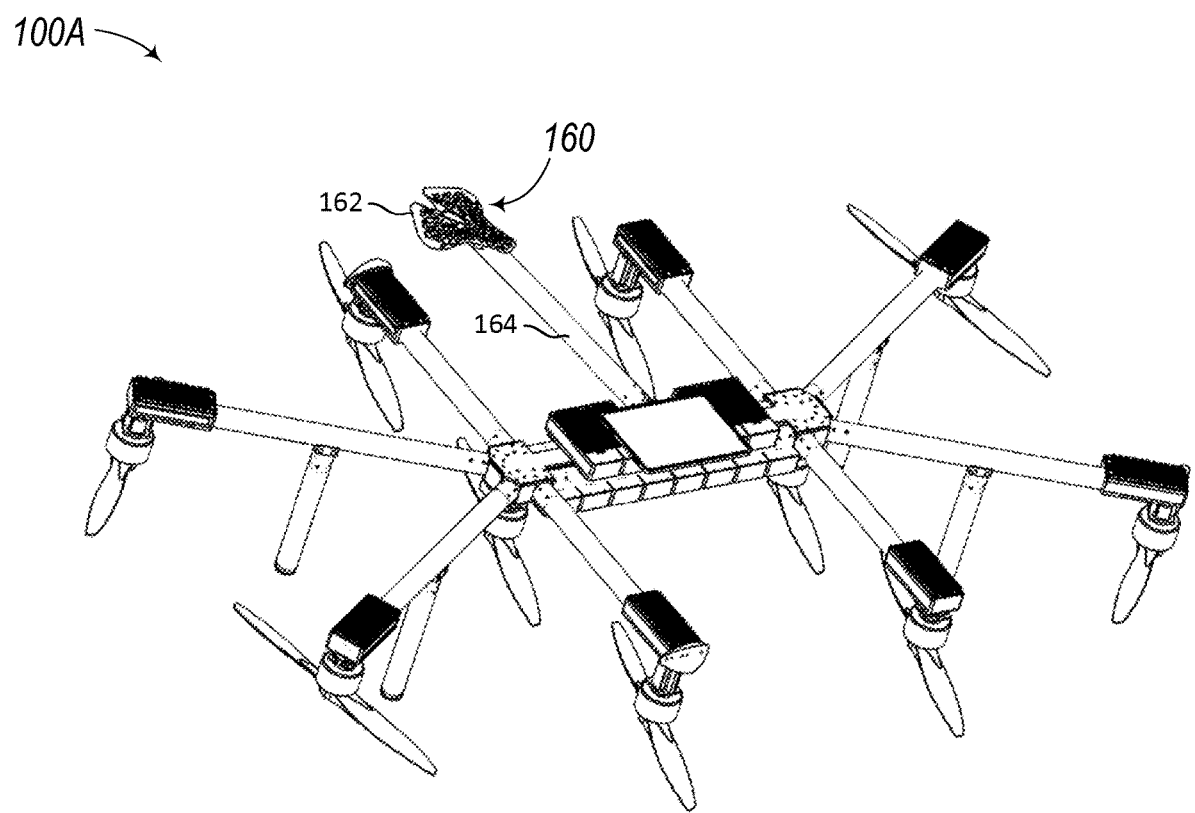
FIG. 1B is a perspective view of the bottom of the compact personal flight vehicle of FIG. 1A, according to an embodiment.

FIG. 1B is a perspective view of the bottom of the compact personal flight vehicle 100A, according to an embodiment. Vehicle 100A can be structurally and/or functionally similar to vehicle 100 shown and described above with reference to FIG. 1A. The example of FIG. 1B includes an attachment configured to support a majority of the pilot's weight (e.g., a seat assembly 160). In some embodiments, the attachment configured to support the majority of the pilot's weight may include a seat, an apparatus to support a pilot lying down, suspension swing-type seats, etc. The example of FIG. 1B includes seat assembly 160, which includes seat 162 which is attached to one end of seat support rod 164. The opposite end of seat support rod 164 is attached to frame (as seen in FIG. 3A). In some embodiments, seat assembly 160 may be pivotably attached to the frame. In some embodiments, the seat assembly 160 may only pivot in certain axes. For example, the seat assembly may be configured to allow the pilot's seat to lean left and right relative to the pilot, but not forward and backward relative to the pilot, thus allowing the upper body of the pilot to be used for, in some embodiments, controlling the vehicle. The seat assembly 160 in FIG. 1B is pivoted all the way to the right, allowing a clear view of seat assembly 160. The seat 160 is attached to the center of the frame, on the rear connection bar (the frame is further described in reference to FIG. 3A). In some embodiments, the connections between the seat assembly 160 (e.g., including seat support rod 164 and/or seat 162) and the frame are formed of a strong, light-weight material, such as carbon fiber or aluminum.

Figure 2:
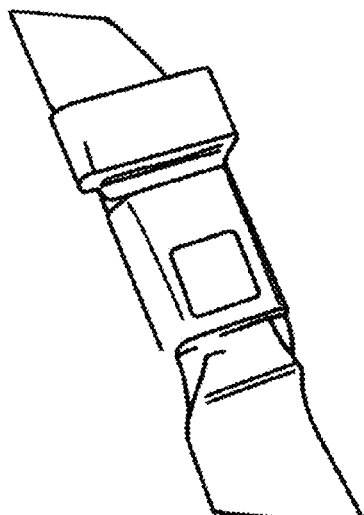
FIG. 2 is an example of a restraint to secure a person in the compact personal flight vehicle of FIGS. 1A and 1B, according to an embodiment.

In some embodiments, the compact flight vehicle 100A may include a restraint to secure a person in the compact personal flight vehicle. FIG. 2 is an example of a restraint to secure a person in the compact personal flight vehicle 100A of FIGS. 1A and 1B. In the example embodiment of FIG. 2, the restraint is a strap that passes through the bottom of the seat and fastens around the pilot's waist in order to secure the pilot to the aircraft. In some embodiments, the restraint may include a quick release button for removal after operation or in case of an emergency. In some embodiments, the restraint may include a sensor that detects whether the restraint is fastened.

FIG. 3A is an assembly drawing of a frame 300 for a compact personal flight vehicle, according to an embodiment. The frame 300 may be, in some embodiments, functionally and/or structurally similar to the frame described in reference to FIGS. 1A and 1B. For example, the frame 300 may be the frame of FIGS. 1A and 1B with the battery units 120, boots 150, and tablet computer 130 removed. The frame 300 may be provided in a plurality of configurations and may be constructed from one or more elongated bars. In the illustrate example embodiment, the frame 300 includes a first and a second bar 302 (e.g., the center bars 302, also referred to herein as central member(s)). Endplate(s) 304 are coupled to a top surface and/or bottom surface of the center bar(s) 302, for example at both ends of the center bar(s) 302. In the embodiment of FIG. 3A, the center bars 302 are located parallel to one another. In some embodiments, the frame 300 may include fewer or additional center bars 302. For example, the frame 300 can include 1, 2, 3, 4, 5, 10, 15, 20, 25, etc. center bars 302, inclusive of all values therebetween. For example, the frame 300 can include six center bars 302 arranged in a hexagon. In some embodiments, the frame 300 can include additional supporting members to increase the stiffness of the frame 300.

The frame 300 also includes a plurality of arms 110. In the example of FIG. 3A, the compact personal flight vehicle contains eight arms 110, but other embodiments may have fewer or more arms 110. For example, the frame 300 can include 4, 5, 6, 7, 8, 9, 10, etc. arms 110, inclusive of all values therebetween. In some embodiments, the arms 110 are disposed symmetrically about the frame 300. In some embodiments, at least one arm 110 forms an acute angle with at least one of the central bars 302. In some embodiments, at least one arm 110 is substantially perpendicular to at least one of the central bars 302. For example, in the embodiment of FIG. 3A, one-half of the arms 110 are coupled to the endplate(s) 304 at one end of each of the center bars 302, and the remaining arms 110 are coupled to the endplates 304 at the opposite end of the center bars 302. For example, in an embodiment that includes four endplates 304 (top left, top right, bottom left, bottom right), a first endplate 304 can be coupled to the top surface of a first half of the arms 110, a second endplate 304 is coupled to the bottom surface of the first half of the arms 110, a third endplate 304 can be coupled to the top surface of a second half of the arms 110, and a fourth endplate 304 can be coupled to the bottom surface of the second half of the arms 110. In some embodiments, the frame 300 is rigid such that torsional loads applied by the pilot do not substantially twist the frame 300 and thereby do not produce substantial attitude changes in the flying vehicle. For example, if the pilot shifts weight onto the ball of one foot and the heal of the other foot, the vehicle will generally maintain the same attitude in the air.

A motor mount 108 may be coupled at or near the end of each arm 110 that is opposite the end connected to the endplates 304. As shown in FIG. 3A and discussed further below in FIGS. 6-9B, the length of each motor mount 108 varies according to the position of the motor mount 108. In some embodiments, the position of the motor mounts 108 can be configured specifically to provide sufficient stability when in operation.

Frame 300 also consists of a plurality of leg mounts 308 on the arms 110. In the example of FIG. 3, a total of four leg mounts 308 are shown, but in other embodiments any number of leg mounts may be provided. One leg 112 is coupled to each leg mount 308. In some embodiments, some of the arms 110 can include no leg mounts 308. In some embodiments, some of the arms 110 can include more than one leg mount 308. In some embodiments, leg mounts 308 can be fastened, adhered, and/or welded to the arms 110.

In some embodiments, the frame 300 includes lights (e.g., incandescent lights, LED lights, etc.). The lights can function as traditional aviation lights for other aircrafts to know position and direction of travel. The lights may also be configured assist the pilot in seeing the ground during operation. For example, the lights can include a spotlight, flood light, and/or the like configured to illuminate surfaces within proximity of the vehicle. The lights (e.g., lights used for communicating vehicle position) are configured to meet FAA standards for aircraft operation.

The frame 300 is configured to be configured to lift and carry a human passenger. The components of the frame 300 are configured to withstand the loads associated with lifting a human passenger. For example, the materials, shape, and/or configuration of the components of the frame 300 are specifically designed to withstand the forces, torsional loads, and/or the like associated with carrying a human passenger. In some embodiments, the frame 300 may be formed of lightweight materials with high strength properties. For example, the frame 300 may be formed of at least one of carbon fiber, titanium, aluminum, and/or the like. In some embodiments, the frame 300 may be rated to lift 500 pounds with a 1.5 safety factor and configured to withstand 750 pounds. In some embodiments, the frame 300 may be configured to lift up to 1000 pounds. A prototype frame structurally similar to frame 300 was tested by placing 93.75 pounds at the end of each of the 8 arms while the prototype frame was supported in air, held only by the 2 foot-mounting positions. During the test, the deflection on each arm was less than 1 inches. This process was cycled 750 times, simulating 750 takeoff and landing flights.

In some embodiments, the frame 300, when legs, such as the legs 112, are coupled, may stand from about 3-15 inches off the ground. In some other embodiments, this distance may be different and/or variable. For example, if taking off in high grass and/or dusty environment, longer legs may be preferred. Otherwise, shorter legs will make the aircraft lighter and more compact, thus, leading to more desirable operating performance. By making the aircraft as light and compact as possible, the pilot may achieve better performance using shorter legs.

In some embodiments, the size of the aircraft, and thus the frame 300, is variable based on the propeller selection. For example, longer arms 110 may be desirable for larger propellers to provide sufficient spacing between the propellers. Conversely, smaller propellers may have less lift and thus shorter arms 110 may be desired to save weight. The propeller section varies based on the desired performance of the pilot, further discussed in reference to FIG. 7 below.

Figure 4:
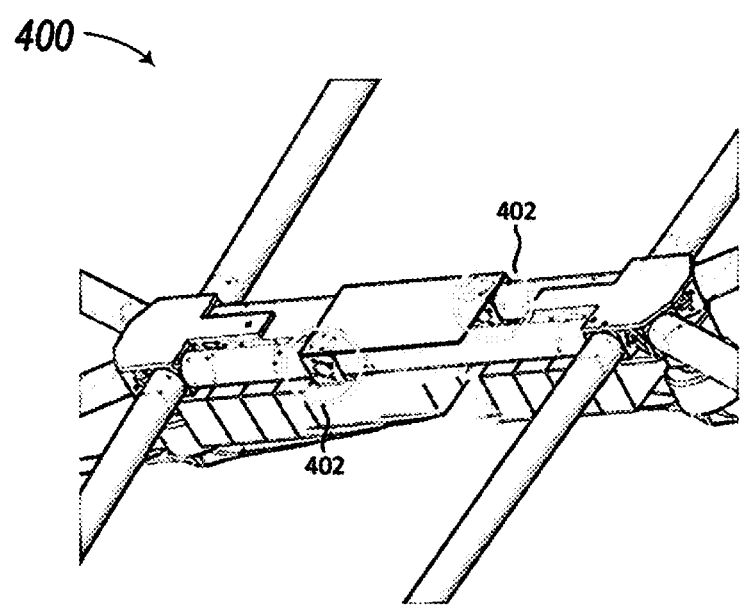
FIG. 4 is a perspective view of flexible joints of a flexible frame for a compact personal flight, according to an embodiment.

In some embodiments, a flexible frame may be desired. For example, a flexible frame may aid in rotation and/or turning of the vehicle. A flexible frame can be formed of a rigid material divided into two sections having a section composed of a more flexible material points disposed between them. FIG. 4 shows the flexible joints 402 of a flexible frame 400 for a compact personal flight vehicle consistent with an embodiment of the present disclosure.

In some embodiment, the flexible joints 402 are carbon fiber blocks that are disposed about one-third of the length from each end of the frame tubes 302. The addition of the carbon fiber flexible joints 402 allows the aircraft frame to twist. In some embodiments, the flexible joint 402 allow for positive and negative twist of about 15 degrees. In some embodiments, the flexible joint 402 may allow for positive and negative twist of greater than about 5 degrees and no more than about 30 degrees. In these embodiments, the frame of the vehicle is sufficiently flexible to allow for a controlled torsion by having the pilot twist the frame with the forces applied by their feet. The torsion on the frame causes a misalignment between the two sets of propulsion systems (e.g., sets of motors with propellers), which, in turn, makes the vehicle yaw along a vertical yaw axis of the vehicle. The flexible joints 402 are formed of a material that may be continuously twisted with minimal degradation.

Figure 5A:
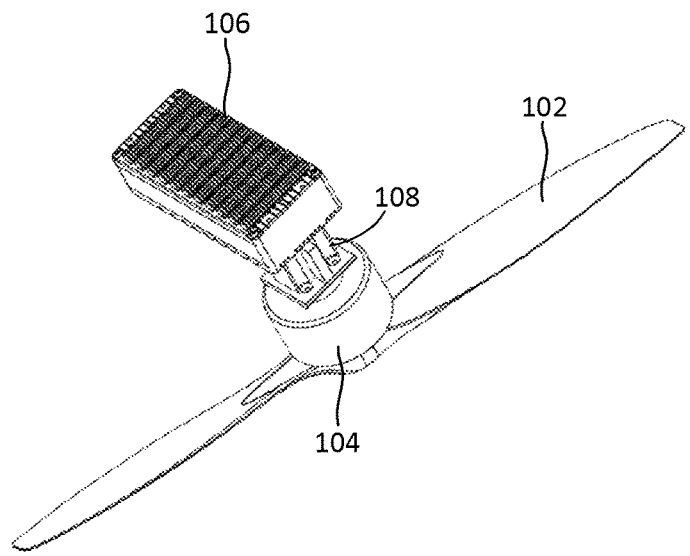
FIG. 5A is a propeller assembly for a compact personal flight vehicle, according to an embodiment.
Figure 5B:
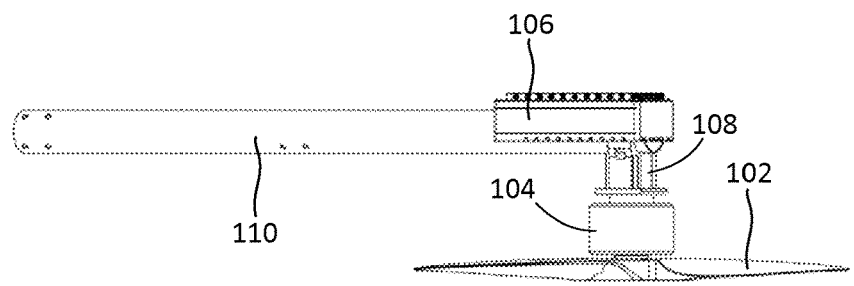
FIG. 5B is a side view of the propeller assembly of FIG. 5A.
Figure 5C:
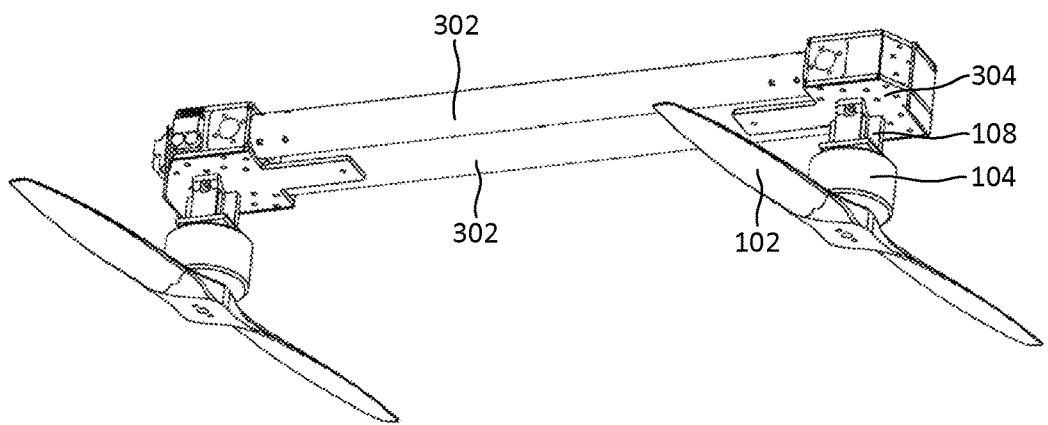
FIG. 5C is a perspective view of the propeller assembly of FIG. 5A, according to an embodiment.
Figure 5D:
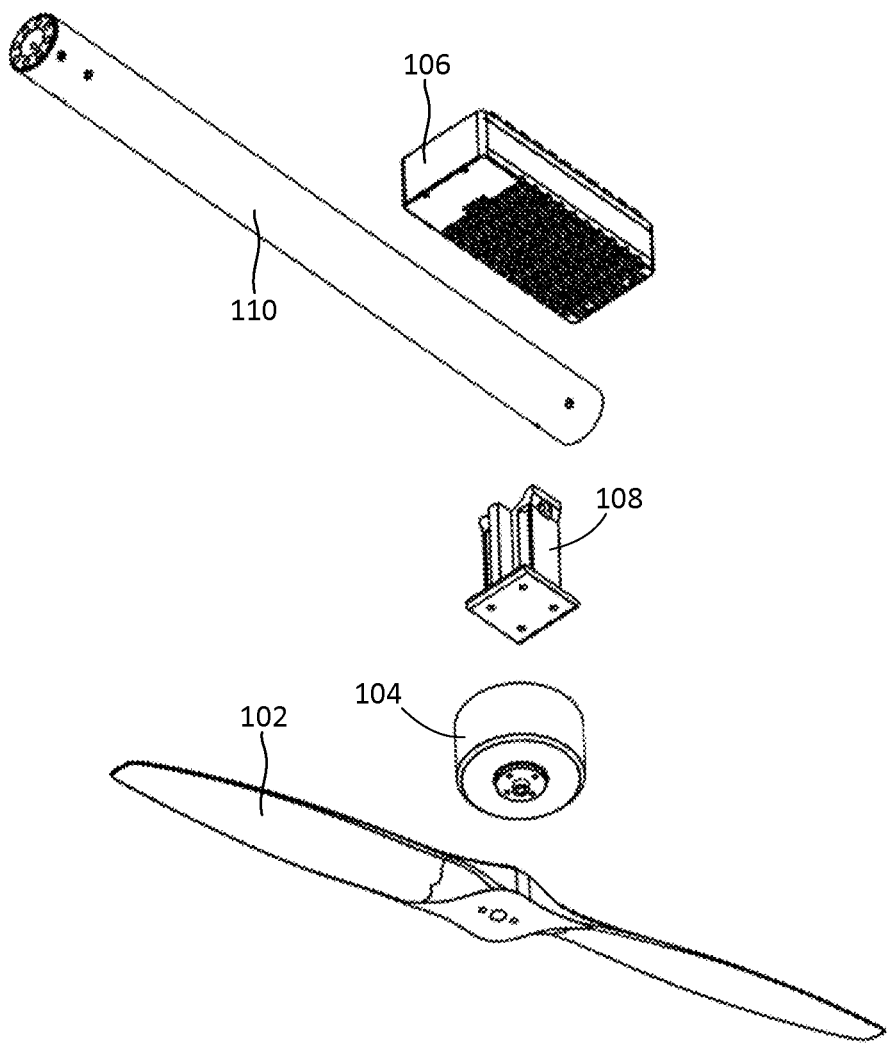
FIG. 5D is an exploded view of a propeller assembly mounted on a frame endplate for a compact personal flight vehicle, according to an embodiment.

FIG. 5A is a perspective view of a propeller assembly for a compact personal flight vehicle, according to an embodiment. The example propeller assembly in FIG. 5A includes a propeller 102, a motor 104, an electronic speed controller 106, and a motor mount 108. FIG. 5B is a side view of the propeller assembly of FIG. 5A mounted to an arm 110. FIG. 5B depicts the arm 110, which is part of the frame 300. As seen in FIG. 5B, the propeller 102 is horizontally oriented relative to the ground, frame 300, arm 110, and/or center bars 302. FIG. 5D is an exploded view of the propeller assembly of FIG. 5B.

In some embodiments, the vehicle includes propeller assemblies mounted on the frame endplates 304. FIG. 5C is a perspective view of two propeller assemblies, each mounted on one of the lower endplates 304 at each end of center bars 302.

Figure 5E:
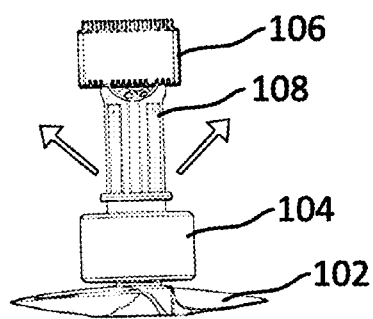
FIG. 5E is a side view of the propeller assembly of FIG. 5A illustrating the adjustability of the motors.

FIG. 5E is a side view of the propeller assembly of FIG. 5A illustrating the adjustability of the motors 104. In some embodiments, the position of the motors 104 maybe configurable about the speed controller 106. In some embodiments, the motors 104 are mounted to the motor mounts 108 in a fixed position. In some embodiments, the motor mounts 108 are constructed of carbon fiber. In other embodiments, any lightweight material of sufficient strength may be used. In some embodiments, the motors may be coupled directly to the arms 110, without the motor mounts 108.

After transport or assembly of the aircraft, position of the motors 104 may require calibration. If a motor 104 is not pointed in a desired direction (e.g., horizontal relative to frame 300, down towards the ground, etc.), it can cause undesired yaw movement (i.e., spinning). While flight is still possible when the motors 104 are misaligned, more power may be used to operate the vehicle, thus lowering the efficiency of the vehicle. In some embodiments, therefore, the motors 104 are adjustable for calibration. In some embodiments, the position of motors 104 can be adjusted by about 0.2 inches to the left or right of the centerline of motor mount 108 in order to calibrate the aircraft.

In some other embodiments, the position of the motors 104 may be adjusted through the attachment of the arm 110 to the frame 300. This may be accomplished by loosening bolts or other suitable attachment mechanism (not shown) attaching the motor mount 108 to the arm 110 and repositioning the motor mount 108 on the arm 110 and tightening the bolts. The adjustment of the arm 110 allows for the position of the motors 104 to be adjusted by about 0.1 inches to the left or right of the centerline of motor mount 108, in addition to the adjustment of the motors 104 themselves.

The propulsion system pushes air down to achieve vertical take-off and landing, flight, hovering, and/or locomotion. The propulsion system includes a plurality of propellers 102, each driven by a motor 104. The example vehicle of FIG. 1 illustrates a vehicle with ten propellers 102. In some embodiments, the propellers 102 are configured to direct airflow down towards the ground. In some embodiments, vehicle may be configured with propellers 102 in a fixed, calibrated location with fixed blade pitch. In some other embodiments, the vehicle may include propellers 102 having orientations and/or positions that are manually or electronically adjustable before or during flight. In some embodiments, the vehicle may include propellers 102 capable of variable pitch.

In order to counteract yaw rotational forces that motors produce while in operation (e.g., torque effects), in some embodiments, one-half of the propellers spin in one direction, e.g., clockwise, while the other half of the propellers spin in the opposite direction, e.g., counterclockwise. In some embodiments, different types of propellers are used to counter torque effects. In some other embodiments, the number of clockwise propellers and counterclockwise propellers may not be equal.

Figure 6:
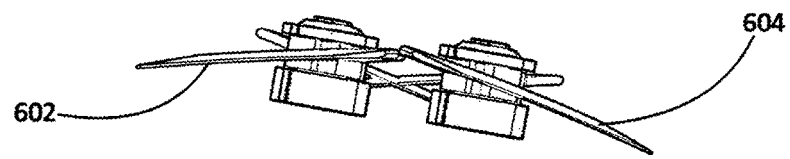
FIG. 6 is an example of two propellers that spin in opposite directions for a compact personal flight vehicle, according to an embodiment.

In the embodiment shown in FIG. 1, five propellers spin clockwise, and five propellers spin counterclockwise. As with the motor mounts 108, the propellers 102 may also alternate and be symmetrical across the aircraft. For example, immediately adjacent propellers may be different and configured to rotate in opposite directions. The design of the five propellers that spin clockwise can be an inverted design of the five propellers that spin counterclockwise, allowing the torque effects to cancel. FIG. 6 is an example of two adjacent propellers that spin in opposite directions for a compact personal flight vehicle, according to an embodiment. The two propellers shown in FIG. 6 illustrate both counterclockwise propeller 602 and clockwise propeller 604, the pitch angle of the two propellers 602 and 604 are the same. In some embodiments, the pitch angles of the propellers are between about 5 degrees and about 15 degrees. In some embodiments, the pitch angle is between about 6.5 degrees and 12 degrees.

Figure 7:
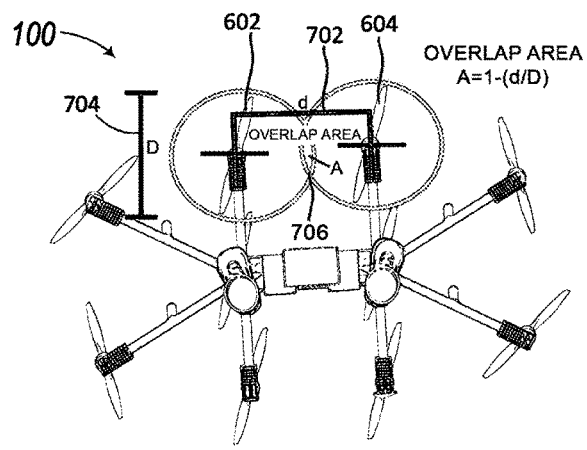
FIG. 7 is an example of an overlap area of two propellers for a compact personal flight vehicle, according to an embodiment.

The size of the aircraft may be variable and based directly off of the propeller selection. The propeller section varies based off of the pilots customized performance requirements. In some embodiments, the propellers 102 overlap in order to keep a compact profile. FIG. 7 is an example of the overlap area of two propellers for a compact personal flight vehicle, according to an embodiment. In order to make the vehicle as compact as possible, the frame should be as small as possible, and this overlap determines the smallest possible aircraft profile.

In the illustrated example embodiment of FIG. 7, the tips of the propellers 102 overlap about 20% of the area of the propellers (e.g., the swept area). In some implementations, the overlap may be greater than about 0% and less than about 40% of the area of the propellers, inclusive of all values therebetween. In some embodiments, the overlap can be at least 10%, 15%, 20%, or 25%. In some embodiments, the overlap is less than about 20%, 25%, 30%, or 35%. Substantial overlap between the propellers can make the vehicle more compact and can significantly increase the efficient of the vehicle relative to vehicles with no or trivial amounts of propeller overlap. For example, a 20% overlap can have an approximately 1-5% efficiency gain. Operating efficiency may also be further increased as the diameter of the propellers increase, therefore, overlapping propellers allows for the use of more efficient longer propellers and still keep a compact form. This exact amount of overlap may be different for every propeller design since airflow is not the same with every airfoil. Different propeller designs may be used for various performance requirements. For example, if a priority is a vehicle with heavier lift capacity, the pitch of the propeller can be increased from, for example, 7 to 8 degrees. The pitch of a propeller is defined as the distance a propeller would move in one revolution if it were moving through a soft solid, like a screw through wood. This means the propeller blade will be steeper and the vehicle will now have the ability to push more air, therefore increasing lift capacity while increasing a motor's current draw when operating at the same rotational speed. Increased current draw could vary the selection of other components, as discussed herein. The desired overlap distance for a selected propeller design can be determined through testing. The example of FIG. 7 shows a calculation of distance (d) 702 which the motors 104 should be apart from each other so that overlap area (A) 706 is 20%, where D equals the propeller diameter 704. To test the overlap area, at each 1% step, the current draw should be recorded over a period of 60 seconds. Based on testing, a peak increase in thrust and efficiency was found to be between 1-20% area overlap. Beyond a threshold amount of overlap, e.g., 20%, 25%, 30%, or 35% overlap, efficiency can decrease. Thus, some embodiments described herein relate to vehicles having propellers that partially, but do not completely overlap. In some embodiments, the diameter of the propellers is between about 17 inches and 35 inches. In some embodiments, the diameter of the propellers is at least about 10 inches and no more than about 35 inches.

Figure 8A:
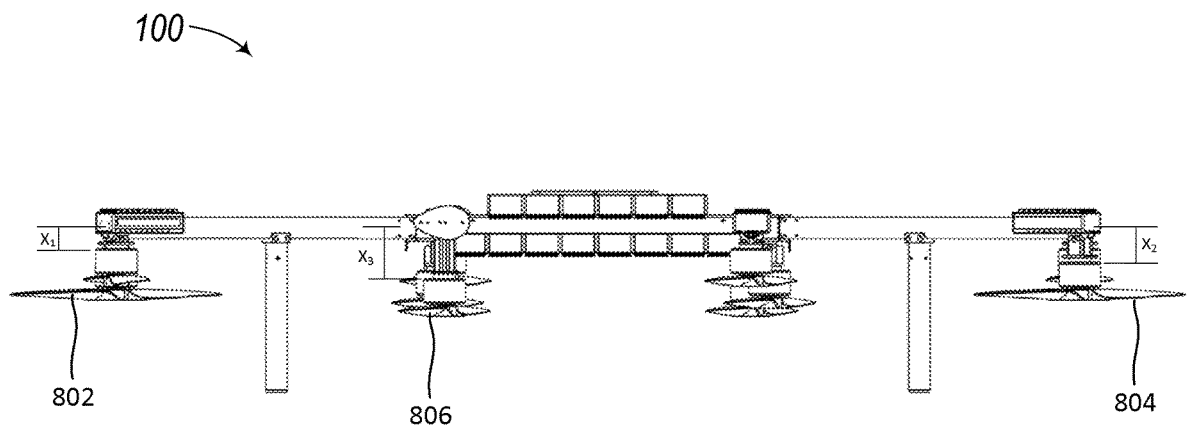
FIG. 8A is a side view of the compact personal flight vehicle of FIG. 1A illustrating the different offsets for the propellers.
Figure 8B:
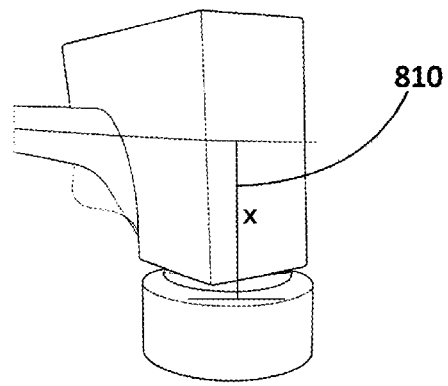
FIG. 8B is an example of the mounting height offset for a propeller for a compact personal flight vehicle, according to an embodiment.
Figure 8C:
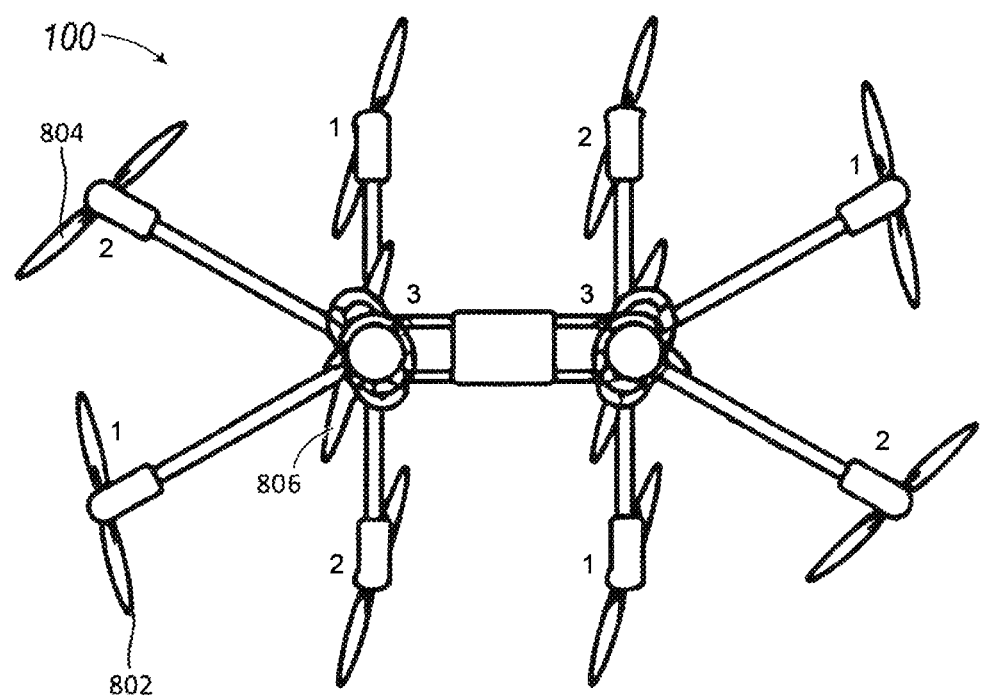
FIG. 8C is a top view of the compact personal flight vehicle of FIG. 1A illustrating an example of the placement of propellers on different levels, according to an embodiment.

For the propellers to be overlapping, they may be stacked in multiple levels. FIG. 8A is a side view of one example of the compact personal flight vehicle 100 of FIG. 1A illustrating the different levels for the propellers 1 802, propellers 2 804, and propellers 3 806. As can be seen in FIG. 8A, propellers 802 are at an offset $X_1$ in the vertical plane, propellers 804 are at an offset $X_2$, and propellers 806 are at an offset $X_3$. FIG. 8B shows how the offset may be measured for each level. Measurements start from the centerline of the frame tubing 302 and extend down to the top of the motor 104. In the example of FIG. 8A, the offsets are about 1 inch for offset $X_1$, 1.5 inches for offset $X_2$, and 2 inches for offset $X_3$. Although the offsets illustrated in FIG. 8A are about 0.5 inches per step, many other offset sizes are possible. For example, the offset is at least about 0.1 inches and no more than about 5.0 inches, inclusive of all values therebetween. In some embodiments, the offset is less than 1 inch. In some embodiments, the offset is about 0.1 inch, about 0.2 inches, about 0.3 inches, about 0.4 inches, about 0.5 inches, about 1 inch, about 2 inches, about 3 inches, about 4 inches, or about 5 inches.

As described herein, a priority may be a vehicle with heavier lift capacity to carry either a pilot or an extra load (e.g., additional passenger, cargo, etc.). If, however, the pilot wishes to prioritize flight time over lift capacity, propellers pitch angle can be lowered from, for example, 8 to 7 degrees. Lowering the pitch value of a propeller causes the motor to spin faster in order to lift the same weight. In some embodiments, the vehicle may have peak efficiency in operation when it can hover in place when the motor throttle is set to 60%. In some embodiments, peak efficiency may be at a pitch value of approximately 7 degrees.

Operating efficiency may be further increased as the diameter of the propellers increase. Since the vehicle is intended to be as compact as possible, longer propellers are more efficient in operation but reduce the compact profile. In some embodiments, a desired propeller under about 35" diameter is selected. Shorter propellers require increased rotation to achieve the same lift. For example, a shorter propeller may be operated at high speeds up to 15,000 revolutions per minute (RPM). In some embodiments, a thick/flexible carbon fiber material is used for the shorter propeller designs to withstand the rotational speed. In some embodiments, the propellers may be configured to rotate between 5,000 and 20,000 RPM. In some embodiments, the propellers are configured to rotate at least about 5,000 RPM and no more than about 30.000 RPM. In some embodiments, the propellers are collectively configured to produce at least 200 pounds of thrust total.

While lightweight consumer drones that are inoperable to lift significant loads generally have propeller speeds of 1,500-4,000 RPM, which operate in a subsonic regime, the vehicle described is configured to allow for higher propeller speeds so that a human being can be supported, while maintaining a compact design. The propellers are designed for safe and efficient operation beyond supersonic tip speeds. The motors and speed controls are also designed to be able to rotate and monitor the status (e.g., RPM) of the propellers at such high speeds. Additionally, the vehicle described herein includes a motor that allows the flow of air to be channeled through the motor and maximize contact with motor coils and bearings to control temperature within the motor, allowing temperatures associated with the motor to stay in a safe operating range. Additionally, the materials and hardware used in the vehicle described herein dampen vibrations allow for the propellers to rotate at supersonic tip speeds, as shockwaves produced at supersonic tip speeds can introduce significant vibrations during operation. Additionally, the motors and electronics are isolated from the frame with a vibration dampening material so that vibrations from the motors don't vibrate other portions of the vehicle. Furthermore, to allow for high propeller speeds, the power system is designed to support the power draw associated with the high propeller speeds and to prevent electromagnetic interference and unwanted current transfer to the frame through isolated power and control wires.

For example, a configuration for lifting a 200 pound load includes about 18" diameter propellers with about 7 degree pitch angles spinning at about 15.000 RPM. The propeller may be designed to be capable of operation without failure at or over 50 pounds of thrust and tested with 750 cycles of 0-50 pounds of thrust to ensure safe operation.

Figure 11:
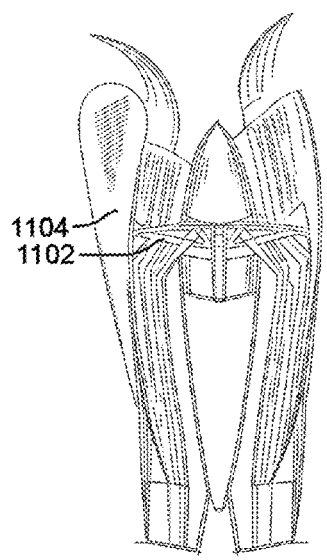
FIG. 11 illustrates one possible embodiment of a ducted fan for a compact personal flight vehicle, according to an embodiment.

In some embodiments, enclosed propellers may be used. FIG. 11 illustrates one possible embodiment of a ducted fan, according to an embodiment. The ducted propeller (e.g., ducted fans, etc.) may be more aerodynamically efficient than the open propeller since the duct can allow the propeller to produce additional thrust for the same power consumption as a propeller with a duct. In the example of FIG. 11, air enters from the top and into a chamber 1104 with the propeller 1102 inside and is expelled out of the bottom of the duct. In some embodiments, the length of the duct can be configured for a desired efficiency or desired lift. In some embodiments, a cage may be disposed around the propellers which will keep the pilot and/or its surroundings from coming in contact with the blades.

In some embodiments, the propellers are removable. Removing propellers allows for easy travel or replacement after damage. In some embodiments, the propellers are designed to mount to the motor using at least two screws (not shown), (e.g., M4 size titanium size with a diameter of about 23 millimeters). In some embodiments, the propeller may be mounted with additional screws.

Figure 9:
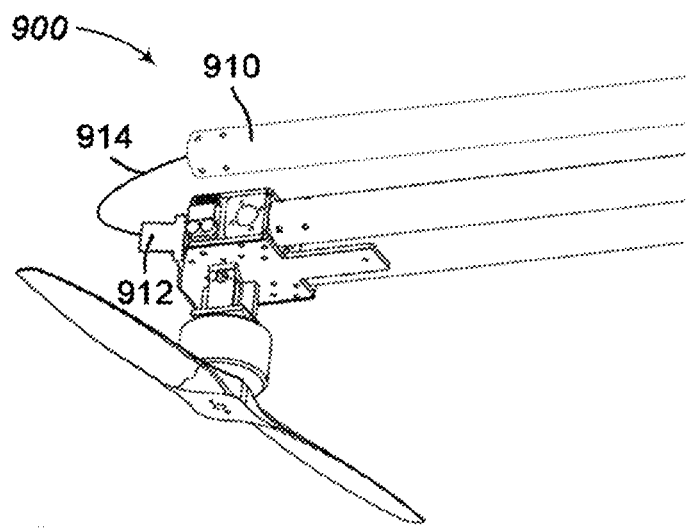
FIG. 9 is an illustration of the compact personal flight vehicle of FIG. 1A in a folded configuration.

In some embodiments, the frame is designed to be foldable to allow for easier transport. In some embodiments, the frame may include hinges to allow the frame to be folded. In some embodiments, frame tubes may be telescoping to allow the frame to be collapsed. FIG. 9 is an illustration of a compact personal flight vehicle 900 (e.g., structurally and/or functionally similar to the compact personal flight vehicle 100 of FIGS. 1A and 1B) in a folded configuration. In the embodiment of FIG. 9, four legs=910 are configured to fold into a compact position. In some embodiments, the legs 910 are removed after removing 8 or less bolts (not shown). Once the bolts are removed, the legs slide off a corresponding leg mount. Each arm 910 has 8 bolts (not shown) which, when removed, allow the arm 910 to slide off of arm connector 912 (further shown in FIG. 3B). In some embodiments, the arms 910 are hingedly coupled to the frame to allow movement between a deployed configuration and a folded configuration. For example, in the folded configuration, arms 910 can be substantially parallel to the central member(s) of the frame, or otherwise form an acute angle with the central member(s) (e.g., an angle of less than 20 degrees, less than 10 degrees, less than 5 degrees, etc.)

High strength copper strand wires 914, e.g., 10 AWG, with extra slack are disposed inside the arm 910. The wires 914 prevents the arm 910 from separating from the arm connector 912 and allow the arm 910 to fold over and be secured to the main frame via, for example, a strap, clip, etc. In some embodiments, the wires 914 are coated in a protective material. In some embodiments, the wires 914 are coated in silicone. For example, the wires are coated in a 0.09 inch thick layer of silicone which is halogen-free on silicone basis. Silicone cables have a molecular structure which are cross-linked to remain in their original shape after high temperature operations. In some embodiments, the hinge location or bending location on the wires is wrapped in a high temperature self-fusing silicone. The insulation is then wrapped in a final layer of solvent-free acrylic adhesive which is naturally resistant to chemical, abrasion and heat damage.

Figure 10A:
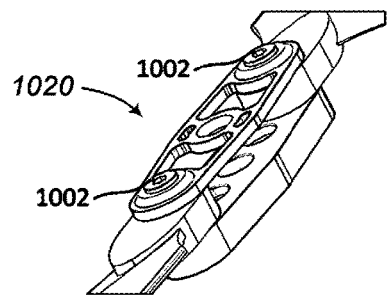
FIGS. 10A, 10B, and 10C are various views of joints in a foldable propeller for a compact personal flight vehicle, according to embodiments.
Figure 10B:
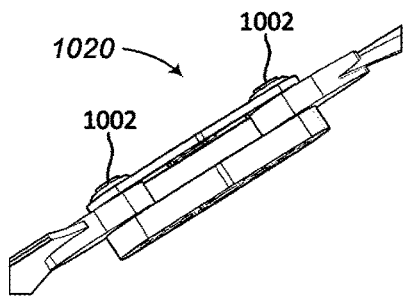
Figure 10C:
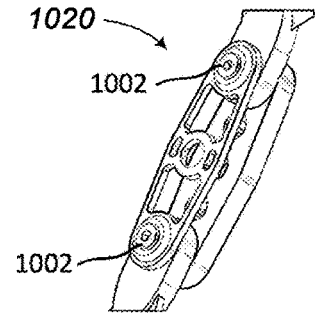

Some traveling does not require full disassembly of the aircraft and therefore, in some embodiments, the pilot may prefer the convenience of folding propellers instead of the fixed propellers of FIG. 1A. FIGS. 10A, 10B, and 10C are various views of the joints in a foldable propeller according to embodiments. In some embodiments, the wires 914 and coating can be configured as tethers and operable to support tension loads, for example, when the frame is in a folded configuration. For example, in some embodiments, moving arms from an extended configuration to a folded configuration can include detaching arms from a socket or other connector of a central member such that only wires 914 form a "hinge" or otherwise tether the arms to the central member. The propellers 1020 (e.g., structurally and/or functionally similar to the propellers 102 of FIGS. 1A and 1B) of FIGS. 10A, 10B, and 10C include joints 1002 which allow the propeller 1020 to fold. Such propellers 1020 can be removable and/or foldable while the aircraft is not in use. In some embodiments, the vehicle uses propellers that do not fold.

Figure 12A:
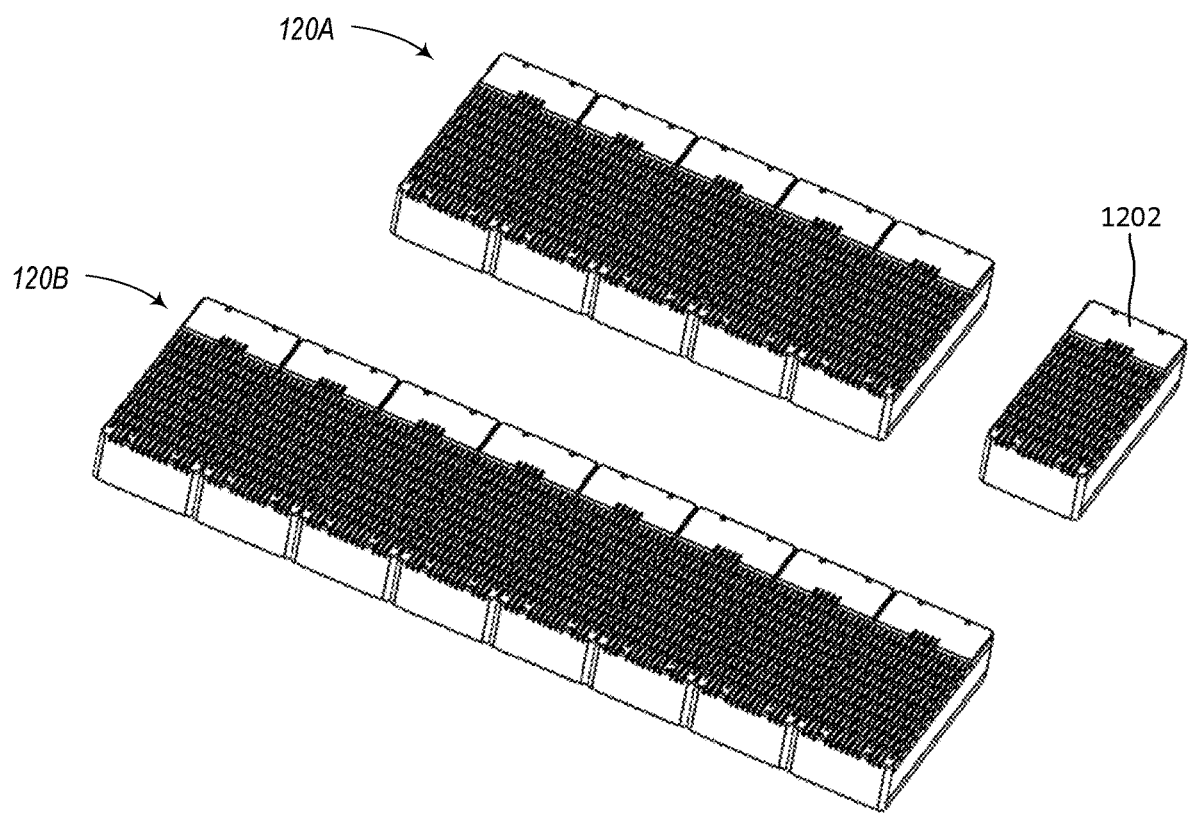
FIG. 12A is an illustrative example embodiment of a power system for a compact personal flight vehicle, according to an embodiment.

FIG. 12A is an assembly drawing of one illustrative example embodiment of a power system for a compact personal flight vehicle, according to an embodiment. The example power system of FIG. 12A consists of one or more batteries, e.g., battery 1202, arranged in one or more battery units. e.g., battery unit 1200A and battery unit 1200B (e.g., functionally and/or structurally similar to the battery unit 120 of FIG. 1A), which store power for the vehicle. The battery units 1200 (e.g., the battery unit 1200A and the battery unit 1200B) can include any number of batteries. For example, the battery units can include one, two, three, four, five, 10, 15, 20, 25, or 50 batteries, inclusive of all ranges and values therebetween.

In some embodiments, all of the aircraft's systems may use a DC voltage which is provided by the battery unit. The storage chemistry for the batteries may be, for example, lithium ion, but other battery chemistries may also be used. In the illustrative example of FIG. 12A, battery 1202 is displayed separate from the battery unit 1200A to illustrate that battery unit 1200A is comprised of individual batteries. In use, however, battery 1202 would be incorporated into battery unit 1200A.

In some embodiments, each of the battery units 1200 consist of one or more cells which are connected in series and/or parallel to build a single scalable unit. In some embodiments, the batteries 1202 can be interconnected so that a fault in one battery 1202 does not compromise the entire battery system 1200. In some embodiments, in order to provide the highest level of safety, the system operates with multiple redundant battery units on board, with all battery units connected in parallel. This allows current sharing across all units in normal operation without inducing a single point of failure. If one system fails, others will remain in operation.

In some embodiments, the battery units are configured to provide a specific voltage, performance output and/or capacity specifications to achieve desired motor operation, which varies based on the specific requirements (e.g., lift capacity, acceleration) of the pilot. The selection of these requirements affects the selection of motors and propellers. In some embodiments, high voltage systems (e.g., 45-70V) are used for the vehicle. In some embodiments, performance output of the battery units 1200 may be 1500 amps (A) or more.

In some embodiments, the configuration for main motor power may include an approximate weight of about 68 pounds, a maximum continuous current of about 1575 A, a power system storage capacity of about 148.75 amp hours (Ah), a nominal voltage of about 46.8 volts (V), with an operating voltage range of about 37.7-54.6V.

In some embodiments, all electronic controls use a separate power system to prevent failures from the main power system resulting in the failure of the controls systems to increase safety. In some embodiments, the electronic controls operate within a voltage range of 9-14V. In some embodiments, the disclosed vehicle has a 2000 milliamp hour (mAh) storage capacity to support, for example, three flights before recharging.

Increasing storage capacity of either the main motor or electronic controls power system will increase total vehicles weight. The increased weight will affect the propeller and motor selection as it requires the system to draw more current while in operation. Therefore, in some embodiments, the capacity of the power system can be varied to achieve different performance or to achieve a desired flight.

If desired performance requires a weight reduction, lithium polymer battery chemistry may be chosen over lithium ion for its higher output current and may be used to reduce the weight of the power system. However, when stability is preferred, lithium ion may be chosen over lithium polymer.

While lithium ion and lithium polymer chemistries are discussed above, other types of batteries may be used. Power storage options and chemistries such as aluminum sulfur, aluminum ion, sodium ion, and additional power sources, e.g., alternating current, liquid fuel, or the combination of multiple types for direct consumption (generators) or storage, may also be used.

Figure 12B:
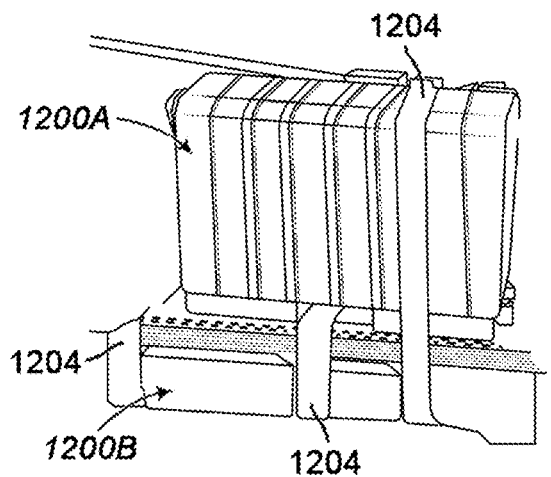
FIG. 12B illustrates an embodiment of a removable battery pack for a compact personal flight vehicle, according to an embodiment.

In some embodiments, the batteries may be removable. FIG. 12B illustrates one possible embodiment of a removable battery unit, according to an embodiment. The illustrative embodiment of FIG. 12B includes battery unit 1200A and battery unit 1200B of FIG. 12A, but the battery units 1200A. 1200B are removable and held in place by straps 1204. In some embodiments, the straps 1204 are constructed of two inch wide synthetic nylon and polyester fibers, but other sizes and materials may be used. Synthetic fibers are selected due to their fire-resistant nature to melt instead of igniting with low thermal conductivity. In some embodiments, the straps can be tightened and then both ends are secured together through a quick release mechanism which slides one end into the other. The example of FIG. 12B shows three straps 1204 holding battery units 1200A, 1200B in place, but any number of straps 1204 may be used. The use of removable battery units allows for easy exchange of battery units between flights for continued operation with additional battery units. The removable units are also designed to create a scalable solution for accommodating various performance requirements. The addition or removal of batteries will modify performance specifications such as lift capacity and flight time. For example, the pilot may desire more lift capacity and can remove a battery unit to achieve more efficient and optimized flight with the additional load. In such an implementation, however, the duration of maximum power operation may be (more) limited due to increased heat generation associated with decreased total battery capacity. In some implementations, it may be desirable to operate around 60% motor speed while hovering as current draw non-linearly (e.g., exponentially) increases past 60% motor speed and the system becomes less efficient.

Figure 13:
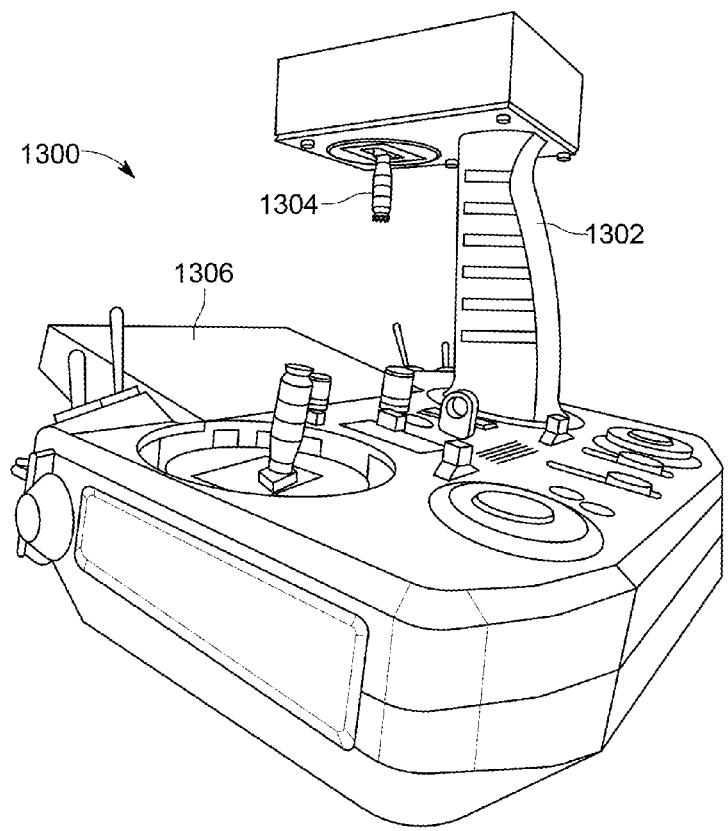
FIG. 13 illustrates an illustrative example of a hand-held controller for a compact personal flight vehicle, according to an embodiment.

FIG. 13 illustrates one illustrative example of a hand-held controller 1300 for a compact personal flight vehicle, according to an embodiment. Controller 1300 can be operable to control motor RPM. In some embodiments, a wireless controller is used. In some embodiments a wired controller may also be used. A customized handheld grip 1302, constructed of, for example, carbon fiber, includes trigger 1304 to allow for variable throttle control. In operation, the pilot holds the controller with one hand and uses his or her index finger to pull the trigger. In some embodiments, the motor RPM signal increases linearly as the trigger is pulled back toward the pilot. Similarly stated position of the throttle is proportional to a rotational speed of each propeller. In other embodiments, a throttle response curve can define a proportional relationship between throttle position and the speed of each propeller. In some embodiments, rotational speed of propellers via controller 1300 may be the only electronic controlled parameter of the vehicle while in flight. Similarly stated, in some embodiments, differential propeller speed, attitude, and/or stability may not be electronically controlled via pilot or other computerized input and may instead be controlled only via the pilot's body position and/or movements.

In some embodiments, the trigger is a gimbal that uses an all-aluminum hall effect sensor which is less prone to wear and more accurate than other solutions. In some embodiments, the gimbal has a resolution of about 4500 discretization levels along the axis of travel. This hall-effect sensor uses digital serial peripheral interface to output 16-bit values, proportional to the magnetic flux density sensed while traveling the length of its axis of movement. The trigger 1304 may be communicatively coupled to a microcontroller in the in the controller 1300 that provides circuitry to transform the signal from the sensors to a channel output with a precision of, for example, 16 bits. For enhanced safety, the circuitry checks that the channel output is linear and without drifts. For further safety and redundant measures, the circuitry includes an automatic detection of digital hall gimbals. If the gimbal is not detected for a predetermined period of time, e.g., of 85 ms, the circuitry reverts to sampling analog sticks on a 3.3V analog rail.

The RPM signal from the trigger 1304 may be transferred by the controller 1300 to the vehicle's motors 104 through one or more signals. In some embodiments, two signal transceivers may be used, one at 2.4 gigahertz (GHz) and the other at 900 megahertz (MHz). The vehicle can have 2.4 GHz and 900 MHz transceivers which receives these two signals and may prioritize the 900 MHz signal. If either of the signals is disconnected at any time, an error may be recorded and displayed to the pilot on the screen 1306 of controller 1300. The pilot may be able to see if one of the transceivers in the vehicle goes offline. The vehicle passes this information to the speed controller(s) which controls the motors 104 accordingly. The speed controllers are further discussed in reference to FIG. 14. In some embodiments, the controller allows for the pilot to setup alarms with the connected devices. For example, the pilot can set the controller to send an alert if one transceiver goes offline.

In some embodiments, a Bluetooth® module is connected to the controller to notify the pilot through in-ear audio feedback. In some embodiments, other monitoring devices which output analog and/or digital signals are able to be connected to inputs on the 900 Mhz transceiver in the vehicle. These analog and/or digital values can be transferred to the controller, which allows the pilot to assign further names and notifications for these signals. For example, temperature sensors can be placed throughout the vehicle to monitor extreme temperatures, such as temperatures on the motors 104 (e.g., 200° C.), the speed controllers 106 (e.g., 200° C.), and the battery units 120 (e.g., 150° C.). The speed controllers output analog information on the motor RPM. If the motors 104 are not operating within, for example, 10% of the same rotational speed, an alarm may be set.

In some embodiments, the battery is monitored through voltage sensors. Once the vehicle decreases to 40% battery power remaining, a landing may be recommended by a signal displayed on screen 1306 of controller 1300, provided by in-ear feedback, in-helmet head-up display, or other suitable user interface.

In some embodiments, vision sensor modules may be placed in various locations around the vehicle. As the vehicle gets closer to objects its pointing at, the analog value will increase. An alarm is sent to the pilot via controller 1300 once objects are within, for example, three meters.

The compact personal flight vehicle 100 of FIG. 1A uses one or more electronic speed controllers 106. In some embodiments, the vehicle may use one electronic speed controller 106 per motor 104. In some other embodiments, the vehicle may use one electronic speed controller 106 shared with multiple motors 104. In some embodiments, the compact flight vehicle 100 can include more than one electronic speed controller 106, each configured to control a subset of the motors 104.

In the example of FIG. 1A, each motor 104 has an electronic speed controller to control motor rotation. The speed controller creates a rotating magnet field in the associated motor 104 to control the speed. In some embodiments, each motor 104 is coupled with an electronic speed controller 106 rated for at least 300 A continuous current. In addition, the motor RPM can be monitored to ensure proper function. The speed controller 106 is able to sense the back electromotive force (back EMF) in order to determine RPM. The actual motor speed is compared to the desired motor speed as determined by the electronic speed controller 106. If errors are detected, the motor 104 is determined to be performing properly, and the pilot is notified. e.g., through screen 1306 on controller 1300. In some other embodiments, Hall effect sensors may be built into the brushless motor 104 in order to signal the speed controller exactly where the rotor position is. Any alternative to Hall effect sensors, such as reed switches, may also be used. In the event that detected errors indicate imminent failure of a motor, that motor and an opposite (e.g., normally operating) motor can be simultaneously powered down. Such symmetric automatic shutdown procedures can enhance stability of the vehicle in the event of an error.

In some embodiments, the vehicle includes one or more electric motors 104 with variable speed control coupled to the frame via the motor mounts 108. The motors 104 may be brushless DC motors, but any other appropriate motor may be used. In some embodiments, the motors 104 are supplied with a continuous current of up to about 300 A. The available continuous current should be about 20% greater than the current drawn by the motor operating at about 100%. In some embodiments, the motor may be able to rotate at least about 15.000 RPM with various propeller sizes under about 35" diameter.

Figure 14:
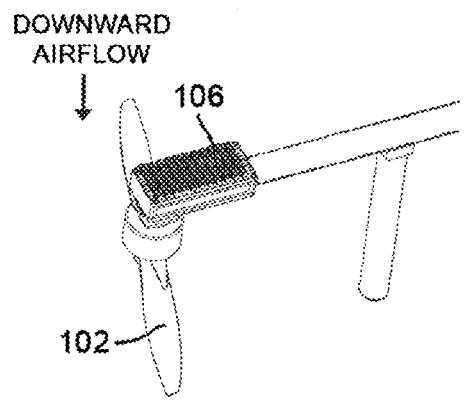
FIG. 14 illustrates a possible embodiment of using airflow from a propulsion system to cool an electronics enclosure for a compact personal flight vehicle, according to an embodiment.

Since the vehicle may be typically operated with heavy loads which requires high motor speeds and high current draw for sustained periods, this may lead to extreme temperatures during operation. Therefore, in some embodiments, cooling methods may be employed. One method that may be employed for cooling the electronic speed controller 106 is to design cooling fins on the electronic enclosures, as shown in various figures such as FIG. 5A. In addition, designing the electronics enclosures from materials which transfer heat more easily. e.g., copper, aluminum, etc., will aid the heat transfer from the enclosure. In some embodiments, the speed controllers are located within the path of air flow for optimized cooling. FIG. 14 illustrates one possible embodiment of using airflow from the propulsion system to cool the electronics enclosure for electronic speed controller 106.

Figure 15:
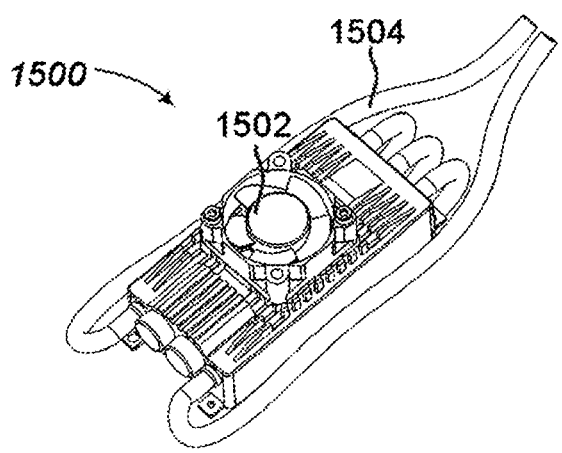
FIG. 15 illustrates an embodiment of using liquid cooling methods to cool an electronics enclosure for a compact personal flight vehicle, according to an embodiment.

In some embodiments, the vehicle may use fans to increase airflow on, around, or inside the electronic enclosures. FIG. 15 illustrates one possible embodiment where fan is mounted on top of an electronics enclosure and directing air through the inside of the electronics enclosure. In other embodiments, the fan mounted on top of the electronics enclosure may be coupled with liquid cooling methods where a cooling liquid is flowing through an area to contact components and draw out heat.

Figure 16:
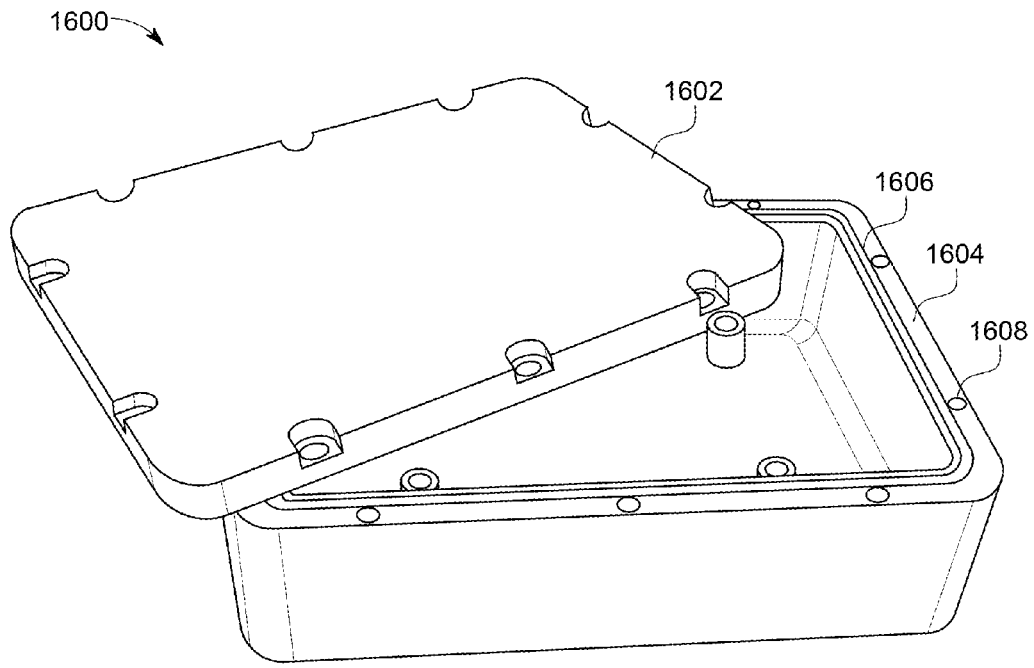
FIG. 16 illustrates an embodiment of an electronics enclosure for a compact personal flight vehicle, according to an embodiment.

FIG. 16 illustrates one possible embodiment of an electronics enclosure 1600, according to an embodiment. In some embodiments, a water resistant or waterproof design is desirable to minimize damage occurs upon light or full submersion in liquid. This enables pilots to train or operate safety above bodies of water. In some embodiments, therefore, the moving parts of the DC motors, including the shaft and bearings, are enclosed and sealed. In some embodiments, corrosion resistant materials such as titanium, stainless steel, and/or treated aluminum may be used. In some embodiments, all sensitive (e.g., capable of sustaining damage during operation) electronics are open to atmospheric air. Conduits exiting the controller (e.g., wires) may be sealed using, for example, silicon type adhesives such as Rutland 800 degree F. Flexible Latex Sealant to waterproof the electronics enclosure 1600

In some embodiments, the enclosure 1600 waterproof rating may be designed according to NEMA Type 6, 6P. The enclosures 1600 can be composed of materials which enable rapid heat to transfer out of the box, such as copper, lightweight aluminum, etc. The example of FIG. 16 illustrates an enclosure 1600 that consists of lid 1602, enclosure base 1604, and O-ring seal 1606. The O-ring 1606 is designed into a groove in the top surface of the enclosure base 1604 to prevent leakage through the fasteners 1608. In some embodiments, the enclosure 1600 can be welded and/or adhered shut.

Figure 17:
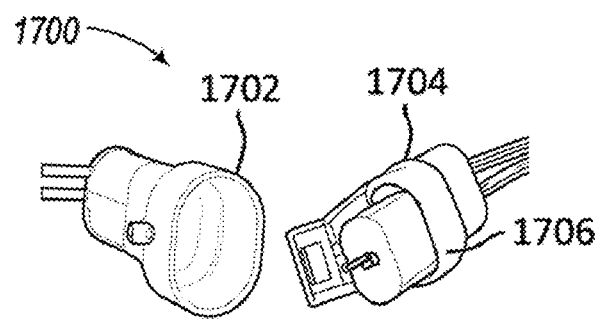
FIG. 17 illustrates an embodiment of a waterproof electrical connector for a compact personal flight vehicle, according to an embodiment.

FIG. 17 illustrates one possible embodiment of a waterproof electrical connector 1700, according to an embodiment. As discussed above in FIG. 16, a water resistant or waterproof design may be desirable to minimize damage occurs upon light or full submersion in liquid. In addition to sealing the electronics enclosures, in some embodiments the electrical connectors, including the battery connectors, may be a waterproof construction. This may include gold plated bullet plugs to prevent corrosion, and all detachable plugs include waterproof seals, e.g., silicone seals. In the example of FIG. 17, electrical connector 1700 includes socket 1702 and plug 1704 which couples into socket 1702 to make an electrical connection. Electrical connector 1700 includes seal 1704, which couples with the outer wall of plug 1704 and the inner wall of socket 1702 to create a waterproof seal. It should be noted that the connectors are rated for the total current output of the system. In some embodiments where a repetitive submersion may take place, an ultra-thin film of dielectric coating may be applied to the outside of all enclosures, seals, and metals, to displace moisture.

Figure 18:
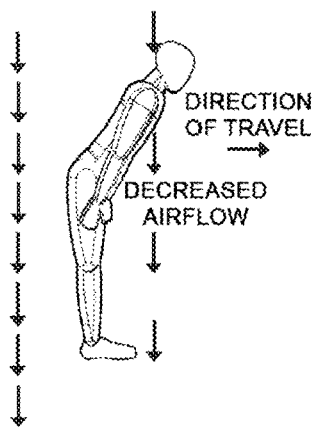
FIGS. 18, 19, and 20 illustrate various movements by a person that cause a compact personal flight vehicle to steer, according to embodiments.
Figure 19:
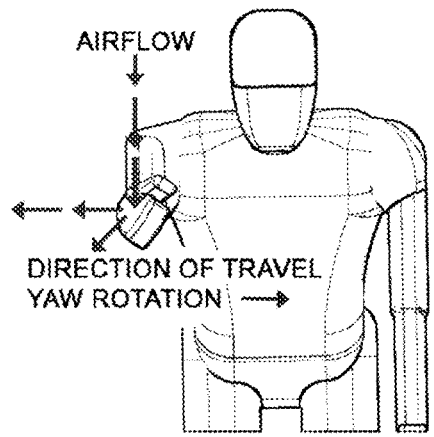
Figure 20:
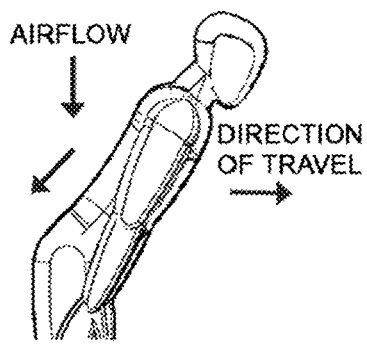

FIGS. 18, 19, and 20 illustrate various examples of movements by a person that can modulate the attitude, velocity, and/or steer a compact personal flight vehicle disclosed herein. In some embodiments, the vehicle is controlled by either the electronic controller 1300, body movements, or both. The pilot is able to move the vehicle in any direction through various upper body movements. While in flight, the pilot is effectively inside a wind tunnel created by the vehicles propulsion system. The pilot can lean their upper body in any direction. Doing so reduces the amount of airflow in that section, causing the corresponding side to drop. As the vehicle drops, it travels in that direction. As the pilot leans further, the vehicle will increasingly rotate which may cause the vehicle to lose altitude. Therefore, pilot may also increase motor throttle as they lean to maintain altitude and continue progression toward the chosen direction of travel and/or rotation. This concept is illustrated in FIG. 18.

In some embodiments, yaw rotation can be achieved two ways. The pilot reaches out with either of their hands with fingers extended and palm parallel with the ground. To start yaw rotation, the pilot can tilt their palm, creating an angle for the airflow. For example, the pilot tilts the palm of their right hand, to the right. As shown in FIG. 19, this increases airflow to the pilots right, causing the vehicle to yaw rotate to the left.

The same principles may apply with the pilot's upper body. When the pilot twists their upper body and then leans, their back may act as a surface to displace airflow in both forward direction and yaw movements. This is illustrated in FIG. 20.

In some embodiments, the compact personal flight full control of the vehicle, other than altitude and/or propeller speed, is dependent upon movements of the pilot's body. In these embodiments, the vehicle is in a mode which does not use sensors to stabilize or fly (e.g., devoid of an active stabilization system), the pilot is only adjusting the output of the motors, and the pilot controls all other movements manually (i.e., non-electronically). Manual control provides the pilot with control with nearly each movement of the vehicle.

In some other embodiments, the compact personal flight vehicle can provide assisted control. The vehicle may assist the pilot in tasks such as take off and stabilized flight, but the pilot remains in active in control of motion. Sensors such as those configured to measure vehicle tilt and the presence of surrounding objects can be used with this type of flight. In these embodiments, active electronic controls can place constraints on the pilot's controls can be limited, thus reducing the likelihood of mistakes that may lead to a crash. An example would be if the vehicle is tilting at an angle at or approaching a limit (e.g., a threshold associated with a limit of safe and/or recoverable flight), and the pilot uses the controller 1300 to tilt further, the pilot's command can be electronically overridden so that the vehicle does not exceed a predetermined tilt threshold. In some embodiments, another type of assisted control includes the use of sensors within the controller 1300. The pilot is able to tilt the controller 1300 with his hand and have the vehicle move in that same direction.

In some embodiments, where the pilot is in an assisted flight control configuration, the pilot can request for the vehicle to take off. While using sensors to monitor the surroundings, the vehicle then automatically takes off and hovers. The pilot then takes control of directional movements with the gimbal stick. If the pilot releases the directional control, the vehicle hovers in place. The pilot can signal the vehicle to land once flight is over.

In some embodiments, the compact personal flight vehicle is controllable partially or fully by the controller 1300. In these embodiments, the pilot is not restricted to controlling motor RPM only and relying on human body movements for steering but can fully control the vehicle by controller 1300. In some embodiments, this can take place with or without the pilot on board. For example, the vehicle can fly to the pilot, the pilot can get on and fly the vehicle.

Although the methods and systems have been described relative to specific embodiments, they are not so limited. Many modifications and variations may become apparent in light of the above teachings. Many additional changes in the details, materials, and arrangement of parts, herein described and illustrated, may be made by those skilled in the art.

As used in this application and in the claims, a list of items joined by the term "and/or" can mean any combination of the listed items. For example, the phrase "A. B and/or C" can mean A; B; C; A and B; A and C; B and C; or A. B and C. As used in this application and in the claims, a list of items joined by the term "at least one of" can mean any combination of the listed terms. For example, the phrases "at least one of A, B or C" can mean A; B; C; A and B; A and C; B and C; or A. B and C.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising". "including" and "having" are intended to be inclusive and mean that there may be additional elements other than the listed elements.

As used herein, in particular embodiments, the terms "about" or "approximately," when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A personal flight vehicle, comprising:
a frame including a central member coupled at a first end to a first one or more arms and at a second end to a second one or more arms;
a first foot binding for securing a pilot to the frame coupled to the central member at the first end and a second foot binding for securing the pilot to the frame coupled to the central member at the second end;
one or more batteries coupled to the central member;
at least two propellor assemblies, each of which is coupled to the distal end of one of the first one or more arms or the second one or more arms, and each of which is electrically coupled to at least one of the one or more batteries, wherein each of the at least two propellor assemblies includes
a propellor,
a motor coupled to the propellor at one end and coupled to an arm of the first one or more arms or of the second one or more arms at the other end, and
a speed controller coupled to the frame and electrically coupled to the motor; and
a controller used by the pilot communicatively coupled to the at least two propellor assemblies that allows the pilot to control the rotational speed of propellors of the at least two propellor assemblies, which is used to generate lift for flight;
wherein the axis of rotation of each propellor is in a fixed orientation that remains parallel to the axis of rotation of all other propellors during operation; and
wherein the orientation of the personal flight vehicle is configured to be controlled in pitch, roll, and yaw solely by movement of the body of the pilot relative to the airflow generated by the at least two propellors, such that all propellors are controlled to rotate at identical rates at all times during flight.

2. The vehicle of claim 1, wherein the central member comprises one or more parallel central bars.

3. The vehicle of claim 1, wherein an enclosure of the speed controller includes cooling fins and the speed controller is located on an arm of the frame within a path of airflow produced by the propellor to provide cooling to the speed controller.

4. The vehicle of claim 1, wherein the first foot binding and the second foot binding comprise ratcheting straps.

5. The vehicle of claim 1, wherein the first foot binding and the second foot binding comprise ski boot type bindings.

6. The vehicle of claim 1, wherein the first foot binding and the second foot binding comprise bicycle clip-in type bindings.

7. The vehicle of claim 1, wherein the first one or more arms and the second one or more arms are disposed symmetrically about the frame.

8. The vehicle of claim 1, wherein at least one battery of the one or more batteries is coupled to the central member on a top of the frame.

9. The vehicle of claim 1, wherein at least one battery of the one or more batteries is coupled to the central member on a bottom of the frame.

10. The vehicle of claim 1, wherein the one or more batteries produce 1500 A or more.

11. The vehicle of claim 1, wherein the one or more batteries comprise lithium ion batteries.

12. The vehicle of claim 1, wherein the one or more batteries comprise lithium polymer batteries.

13. The vehicle of claim 1, wherein the one or more batteries are removable.

14. The vehicle of claim 1, wherein a speed controller of each of the at least two propellor assemblies creates a rotating magnet field in an associated motor to control the speed of the associated motor in response to an electrical signal from the controller used by the pilot and allows the pilot to control the rotational speed of an associated propellor.

15. The vehicle of claim 14, wherein the speed controller of each of the at least two propellor assemblies also senses an electromagnetic force (EMF) of the associated motor and determines an actual motor revolutions per minute (RPM).

16. The vehicle of claim 14, wherein propellors of at least two of the at least two propellor assemblies overlap.

17. The vehicle of claim 15, wherein the speed controller of each of the at least two propellor assemblies compares the actual motor RPM to a desired motor RPM.

18. The vehicle of claim 17, wherein the pilot is notified through the controller used by the pilot if an error is detected from the comparison.

19. The vehicle of claim 14, wherein propellors of at least two of the at least two propellor assemblies include an offset in a vertical plane.

20. The vehicle of claim 14, wherein propellors of at least two of the at least two propellor assemblies rotate in different directions.

21. The vehicle of claim 15, wherein two motors of at least two of the at least two propellor assemblies are mounted to arms through a motor mount and wherein the motor mounts of the two motors have different lengths.

22. The vehicle of claim 14, wherein propellors of the at least two propellor assemblies are configured to rotate at between 5,000 and 20,000 rotations per minute (RPM).

23. The vehicle of claim 14, wherein propellors of the at least two propellor assemblies comprise ducted fans.

24. The vehicle of claim 1, wherein the controller used by the pilot is communicatively coupled to the at least two propellor assemblies using one or more wires.

25. The vehicle of claim 1, wherein the controller used by the pilot is communicatively coupled to the at least two propellor assemblies wirelessly.

26. The vehicle of claim 25, wherein the controller used by the pilot is wirelessly coupled to the at least two propellor assemblies using two different transceivers.

27. The vehicle of claim 26, wherein the two different transceivers comprise a 2.4 gigahertz (GHz) transceiver and a 900 megahertz (MHz) transceiver.

28. The vehicle of claim 1, wherein the controller used by the pilot comprises a handheld grip and trigger to control the rotational speed of propellors of the at least two propellor assemblies.

29. The vehicle of claim 28, wherein the trigger comprises a hall effect sensor.

30. The vehicle of claim 1, wherein propellors of the at least two propellor assemblies are coupled to the frame to provide airflow over the standing pilot in a direction from head to toe that allows the pilot to control attitude, velocity, and direction of a flight with body movements.

* * * * *